US007029014B2

(12) United States Patent
Hamm

(10) Patent No.: US 7,029,014 B2
(45) Date of Patent: Apr. 18, 2006

(54) VEHICLE STABILITY CONTROL SYSTEM

(76) Inventor: Alton B. Hamm, 6201 Riviera Dr., North Richland Hills, TX (US) 76180

( * ) Notice: Subject to any disclaimer, the term of this patent is extended or adjusted under 35 U.S.C. 154(b) by 0 days.

(21) Appl. No.: 11/066,634

(22) Filed: Feb. 25, 2005

(65) Prior Publication Data

US 2005/0184476 A1 Aug. 25, 2005

Related U.S. Application Data

(60) Provisional application No. 60/547,703, filed on Feb. 25, 2004, provisional application No. 60/598,990, filed on Aug. 5, 2004.

(51) Int. Cl.
*B60G 17/005* (2006.01)

(52) U.S. Cl. ................ 280/5.502; 267/265; 280/5.508; 280/5.509; 280/6.15; 280/124.103; 280/124.106

(58) Field of Classification Search ............ 280/5.502, 280/5.5, 6.15, 5.508, 5.509, 124.103, 124.106; 267/265
See application file for complete search history.

(56) References Cited

U.S. PATENT DOCUMENTS 2,684,254 A 7/1954 Goss
2,778,656 A 1/1957 May
2,967,062 A 1/1961 D'Avigdor
3,008,729 A 11/1961 Muller et al.
3,033,590 A * 5/1962 Statler ..................... 280/6.159
3,035,851 A 5/1962 Stengelin
3,232,635 A 2/1966 Drechsel
3,608,925 A 9/1971 Murphy
3,689,103 A 9/1972 Meulendyk
3,721,457 A 3/1973 Tracy et al.
3,883,153 A 5/1975 Singh et al.
4,113,278 A 9/1978 Rissberger
4,552,501 A 11/1985 Clark et al.
4,641,856 A 2/1987 Reichenbach (Continued)

FOREIGN PATENT DOCUMENTS

JP 9323521 12/1997

OTHER PUBLICATIONS

"Trailer Aerodynamic Devices Do More Than Reduce Fuel Cost They Can Also Save Lives," www.airdeflectors.com/Trlr-Roll-PR.pdf., Nose Cone FitzGerald Corp., Jun. 6, 2003, pp. 1-2.

(Continued)

*Primary Examiner*—Eric Culbreth
(74) *Attorney, Agent, or Firm*—Slater & Matsil, L.L.P.

(57) ABSTRACT

A vehicle stability control system is provided, which includes a movable tongue member and a ratchet mechanism. The movable tongue member is adapted to move between a first tongue position and a second tongue position. The ratchet mechanism is adapted to be mechanically coupled to a movable unsprung mass portion and to a sprung mass portion of a vehicle when the vehicle stability control system is operably installed on the vehicle. The ratchet mechanism comprising a ratchet tooth, such that the ratchet mechanism is adapted to restrict a movement of the unsprung mass portion away from the sprung mass portion when the tongue member is moved toward the second tongue position and into the ratchet tooth, and wherein the tongue member does not restrict the movement of the unsprung mass portion relative to the sprung mass portion when the tongue member is in the first tongue position.

46 Claims, 27 Drawing Sheets

U.S. PATENT DOCUMENTS

| | | | | |
|---|---|---|---|---|
| 4,664,408 | A | 5/1987 | Saotome et al. | |
| 4,702,490 | A | 10/1987 | Yamaguchi et al. | |
| 4,903,983 | A | 2/1990 | Fukushima et al. | |
| 4,974,863 | A | 12/1990 | Patin | |
| 5,040,823 | A | 8/1991 | Lund | |
| 5,087,073 | A | 2/1992 | Lund | |
| 5,123,672 | A | 6/1992 | Walton et al. | |
| 5,174,603 | A | 12/1992 | Lund | |
| 5,228,719 | A | 7/1993 | Fukuyama et al. | |
| 5,269,558 | A | 12/1993 | Yoshioka et al. | |
| 5,437,354 | A | 8/1995 | Smith | |
| 5,549,328 | A | 8/1996 | Cubalchini | |
| 5,685,556 | A | 11/1997 | Shibue et al. | |
| 5,836,598 | A | 11/1998 | Parker et al. | |
| 5,899,472 | A | 5/1999 | Burke et al. | |
| 5,971,493 | A | 10/1999 | Robert | |
| 6,219,602 | B1 | 4/2001 | Badenoch et al. | |
| 6,250,649 | B1 | 6/2001 | Braun | |
| 6,296,235 | B1 | 10/2001 | Dalal | |
| 6,446,980 | B1 | 9/2002 | Kutscher et al. | |
| 6,467,784 | B1 | 10/2002 | Kim | |
| 6,550,788 | B1 | 4/2003 | Schmidt et al. | |
| 6,554,293 | B1 | 4/2003 | Fennel et al. | |
| 6,585,275 | B1 | 7/2003 | Carlstedt et al. | |
| 6,651,991 | B1 | 11/2003 | Carlstedt et al. | |
| 6,711,482 | B1 | 3/2004 | Shiino et al. | |
| 6,722,676 | B1 | 4/2004 | Zadok | |
| 6,889,128 | B1 | 5/2005 | DeBoni | |
| 2002/0089128 | A1 | 7/2002 | Charaudeau et al. | |
| 2003/0111816 | A1 | 6/2003 | Carlstedt et al. | |
| 2003/0122336 | A1 | 7/2003 | Zadok | |
| 2003/0204293 | A1 | 10/2003 | Shiino et al. | |
| 2004/0041358 | A1 | 3/2004 | Hrovat et al. | |
| 2005/0110227 | A1* | 5/2005 | Stefan et al. | 280/5.501 |

OTHER PUBLICATIONS

"PICProto USB Prototyping Board," www.melabs.com, microEngineering Labs, Inc.

"Low Profile Size 5SF-Push or Pull," www.ledex.com, Ledex and Dormeyer Products.

"NHTSA: 2002 Highway Deaths Highest Since 1990," www.roadandtravel.com/newsworthy/newsandviews03/2002highwaydeaths.htm.

"Ford announces Roll Stability Control RSCO," www.auto-innovations.com/actu-news/029.html, Dec. 15, 2003.

"2004 Ford Explorer Sport Trac Concept," www.seriouswheels.com/top-2004-Ford-Explorer-Sport-Trac-Concept.htm, pp. 1-3.

"NCAP ratings for 2006Pickup Trucks," www.safercar.gov/index2.cfm.

"2005 ESC Equipped Vehicles," www.safecar.gov/pages/ESC-EquippedVehicles-2005.htm, pp. 1-4.

"Rollover Characteristics: Fatalities," www.safercar.gov/Rolloverr/pages/RolloCharFat.htm.

"SUV Rollover Statistics: SUV Rollovers Continue to Increase," www.suvrollovernews.com/html/article7.html, Jul. 17, 2003.

"2004 Ford Explorer 4-DR.," www.safecar.gov/ncap/cars/2749.html, pp. 1-2.

"2005 Ford Explorer 4-DR.," www.safercar.gov/ncap/cars/3299.html, pp. 1-2.

Garrott, W.R., et al., "A Progress Report on Development of a Dynmaic Rollover Rating Test," Research and Development Safety Performance Standards, http://www-nrd.nhtsa.dot.gov/pdf/nrd-01/SAE/SAE2001/Garrott.PDf, NHTSA, May 15, 2001, pp. 1, 4, and 5.

"MICROCHIP: PIC16F87XA Data Sheet: 28/40/44-Pin Enhanced Flash Microcontrollers," 2003 Microchip Technology Inc., pp. 1, 2, and 5.

"Analog Devices: Low Cost, UItracompact ± 2 g Dual-Axis Accelerometer: ADX:311," 2003 Analog Devices, Inc., pp. 1-12.

* cited by examiner

VEHICLE STABILITY CONTROL SYSTEM

This application claims the benefit of U.S. Provisional Application No. 60/547,703, filed on Feb. 25, 2004, entitled VEHICLE STABILITY SYSTEM, and U.S. Provisional Application No. 60/598,990, filed on Aug. 5, 2004, entitled VEHICLE STABILITY CONTROL SYSTEM, which applications are hereby incorporated herein by reference.

CROSS-REFERENCE TO RELATED APPLICATIONS

This application relates to the following co-pending and commonly assigned patent applications: U.S. patent application Ser. No. 11/065,942, filed herewith, entitled "Vehicle Stability Control System"; and PCT Patent Application Serial No. PCT/US2005/006194, filed herewith, entitled "Vehicle Stability Control System", having attorney docket number ABH-001PCT, which applications are hereby incorporated herein by reference.

TECHNICAL FIELD

The present invention generally relates to improving vehicle safety and controllability. More specifically, it relates to affecting the movement of a vehicle suspension system using a vehicle stability control system during an emergency or severe cornering maneuver.

BACKGROUND

Sport utility vehicles (SUVs) and pickup trucks have grown in popularity among consumers in North America. However, such vehicles are usually more prone to rollover accidents than cars. This is mostly attributed to the higher center of gravity for SUVs and trucks as compared to cars. Even SUVs with independent suspension systems and roll stability control systems may still have a higher tendency to roll over than most cars.

According to statistics from the year 2000, 62% of all SUV deaths occurred in rollovers, which is nearly three times the rate for cars (22%). Some government tests indicate that even the most stable SUV is more likely to rollover than the least stable car. National Highway Traffic Safety Administration (NHTSA) statistics from 2001 estimated that 55% of occupant fatalities in light, single-vehicle crashes involved rollover. Furthermore, in 2001, NHTSA estimated that 60% of the fatalities in vans, 63% of fatalities in pickup trucks, and 78% of fatalities in SUVs were caused by rollover. According to statistics from the year 2002, fatalities in rollover crashes involving SUVs and pickup trucks accounted for 53% of the increase in traffic deaths. In 2002, about 10,626 people died in rollover crashes in the US, up 4.9% from about 10,130 in 2001.

Some rollovers are caused by a vehicle colliding with a curb or abutment during a severe turn or during a lateral slide, which is often referred to as a trip rollover. Even a low profile sports car may rollover when colliding with a trip mechanism. Statistics show that over 90% of trip rollovers are caused by a loss of control of the vehicle. Thus, a need exists to improve vehicle stability during severe cornering or emergency maneuvers.

Some rollovers occur when a driver attempts to avoid a collision with an object (e.g., another vehicle, a person, an animal, etc.) in the road. When a driver swerves to one side (e.g., right) to avoid an object and then attempts to regain control of the vehicle and avoid going off the road by swerving in the opposite direction (e.g., left), this maneuver may cause a vehicle to rollover as well (even when no trip mechanism is encountered). During such maneuvers where the vehicle's weight is shifted from one side to another, as the vehicle suddenly turns one direction (e.g., right) and then immediately turns to back in an opposite direction (e.g., left), the vehicle's suspension springs may contribute to initiating a rollover. This happens because the suspension springs have potential energy mechanically stored as a result of being compressed by the weight of the vehicle.

Even at level straight condition, the weight of the vehicle partially compresses the springs to counteract this weight. This is dramatically demonstrated by a person lifting up on a fender of a 6,500-pound vehicle and being able to move one side of the vehicle upward with ease. When the vehicle's weight is transferred to one side (e.g., right), the spring on that side may be further compressed due to the lateral acceleration of the vehicle and the weight shift toward one side. As the vehicle tilts from one side to another side, as in a right-left maneuver for example, the once compressed spring (during right turning) will push up on the inside of the vehicle (during the immediately subsequent left turning). This pushing up on the vehicle's weight is combined with the lateral forces acting on the vehicle due to the turning motion. This energy stored in the spring can propel one side of the vehicle upward with very little release of pressure on the spring. The vehicle tilt movement caused by the inside spring releasing its stored energy creates rotational momentum that is then added to by the lateral or centrifugal forces created by the turning motion of the vehicle and by the forward momentum from the vehicle's forward movement.

In a severe turn, the suspension system lets the centrifugal force of the turn lower the vehicle on the outside of the turn while at the same time raising the vehicle on the inside of the turn. The upward force applied to the sprung portion of the vehicle by the springs on the inside of the turn is by far the most significant controllable force contributing to loss of control of a vehicle. Thus, the tilt movement initiated by the stored energy in the inside spring may create the momentum needed to initiate a rollover, which the lateral forces of the turning and the forward momentum of the vehicle may bring to fruition. As the vehicle is rotated by this action, it quickly takes less and less pounds of centrifugal force to progress to the next succeeding degree of vehicle rotation. The vehicle in less than one second can be put into a precarious position that can cause the driver to panic as he feels his inability to control the vehicle. This can quickly cause the driver to lose the ability to avoid other vehicles as well as curbs or abutments that can cause a rollover. Hence, a need exists to improve and/or control the stability of vehicles during such severe turning maneuvers. Such improvements may save thousands of lives each year and reduce the number of accidents thereby saving millions of dollars to drivers and insurance companies.

SUMMARY OF THE INVENTION

The problems and needs outlined above may be addressed by embodiments of the present invention. In accordance with one aspect of the present invention, a vehicle stability control system is provided, which includes a movable tongue member and a ratchet mechanism. The movable tongue member is adapted to move between a first tongue position and a second tongue position. The ratchet mechanism is adapted to be mechanically coupled to a movable unsprung mass portion and to a sprung mass portion of a vehicle when the vehicle stability control system is operably installed on the vehicle. The ratchet mechanism comprising a ratchet tooth, such that the ratchet mechanism is adapted to restrict a movement of the unsprung mass portion away from the sprung mass portion when the tongue member is moved toward the second tongue position and into the ratchet tooth, and wherein the tongue member does not restrict the movement of the unsprung mass portion relative to the sprung mass portion when the tongue member is in the first tongue position.

In accordance with another aspect of the present invention, a vehicle stability control system is provided, which includes a movable tongue system, an electrical triggering device, and a ratchet mechanism. The movable tongue system includes an electromechanical actuator and a movable tongue member. The electromechanical actuator is mechanically coupled to the tongue member to provide movement of the tongue member from a first tongue position toward a second tongue position. The electrical triggering device is adapted to be electrically coupled to a signal generating device. The triggering device is also electrically coupled to the electro-mechanical actuator. The triggering device is adapted to activate the electromechanical actuator based, at least in part, on an output signal received from the signal generating device. The ratchet mechanism is adapted to be mechanically coupled to a movable unsprung mass portion and to a sprung mass portion of a vehicle when the vehicle stability control system is operably installed on the vehicle. The ratchet mechanism includes a set of ratchet teeth, such that the ratchet mechanism is adapted to restrict a movement of the unsprung mass portion away from the sprung mass portion when the electromechanical actuator moves the tongue member toward the second tongue position and into the set of ratchet teeth. The signal generating device may be an acceleration measuring device, wherein the output signal corresponds to a lateral acceleration of the vehicle. The output signal may correspond to a movement of a steering wheel on the vehicle, wherein the signal generating device comprises a sensor adapted to measure movement of the steering wheel. The output signal may correspond to a velocity of the vehicle, wherein the signal generating device comprises a sensor adapted to measure the velocity of the vehicle. The output signal may correspond to a vehicle body position relative to a ground surface, wherein the signal generating device comprises one or more sensors adapted to measure a tilt angle of a vehicle body relative to the ground surface. The output signal may correspond to a vehicle body position relative to at least one vehicle wheel, wherein the signal generating device comprises one or more sensors adapted to measure a tilt angle of a vehicle body relative to one or more vehicle wheels. The electromechanical actuator includes a component selected from the group consisting of an electric motor, a solenoid, an electrically-switchable hydraulic valve, a hydraulic actuator, an electrically-switchable pneumatic valve, a pneumatic actuator, an electrically-switchable vacuum valve, a vacuum-driven actuator, an electrically-switchable pyrotechnic-driven actuator, an electrically-switchable explosive-charged actuator, an electrically-switchable compressed-gas-driven actuator, and combinations thereof, for example. The electrical triggering device may include an analog electrical circuit, wherein the analog electrical circuit includes a capacitor, a resistor, and a transistor. The electrical triggering device may include a microprocessor and an amplifier. The tongue member may have an end profile with a shape selected from the group consisting of rectangular, partially rounded, notched, pawl shaped, partially beveled, beveled, hook shaped, lip shaped, flat, curved, concave, convex, and combinations thereof, for example. At least some of the ratchet teeth may have a tooth shape selected from the group consisting of rectangular, partially rounded, notched, pawl shaped, partially beveled, beveled, hook shaped, lip shaped, flat, curved, concave, convex, and combinations thereof, for example. At least some of the ratchet teeth may be formed along a curved path. At least some of the ratchet teeth may be formed along a linear path. The ratchet mechanism may include a first slider portion, and a second slider portion slidably coupled to the first slider portion. The ratchet mechanism may be attached to and part of a shock absorber device. The ratchet mechanism may include a ratchet gear extending from a suspension arm and extending circumferentially at least partially around a pivot axis of the suspension arm, wherein the ratchet gear is fixed relative to the suspension arm and adapted to pivot with the suspension arm about the pivot axis. The ratchet mechanism may include: a first arm; a second arm pivotably coupled to the first arm, at least part of the movable tongue system being attached to the second arm; and a tooth arm extending from the first arm, the tooth arm having the set of ratchet teeth thereon, and the tooth arm extending across at least part of the movable tongue system when the vehicle stability control system is operably installed on the vehicle. The vehicle stability control system may include a roller member attached about a portion of the ratchet mechanism, where the roller member is adapted to rotate about the ratchet mechanism. The ratchet mechanism may include: a pulley member adapted to be rotatably coupled to the sprung mass portion of the vehicle; a cable having a first end attached to the pulley member, the cable extending from the pulley member, where the pulley member is adapted to spool the cable at least partially around the pulley member as the pulley member pivots, and the cable being adapted to attach to the unsprung mass portion of the vehicle to extend between the unsprung mass portion and the pulley member; a pulley spring biasing the pulley member to pivot in a direction that will spool the cable onto the pulley member to keep tension on the cable; and a ratchet gear extending from the pulley member, the ratchet gear having the set of ratchet teeth, wherein the ratchet gear pivots with the pulley member. The movable tongue member may be adapted to pivot about a tongue member axis as it moves from the first tongue position toward the second tongue position. The movable tongue member may be adapted to slide as it moves from the first tongue position toward the second tongue position.

In accordance with yet another aspect of the present invention, a vehicle stability control system is provided, which includes an acceleration measuring device, a movable tongue system, an electrical triggering device, and a ratchet mechanism. The acceleration measuring device is adapted to measure at least a lateral acceleration of a vehicle when the vehicle stability control system is operably installed on the vehicle. The movable tongue system includes an electromechanical actuator and a movable tongue member. The electromechanical actuator is mechanically coupled to the tongue member to provide movement of the tongue member from a first tongue position toward a second tongue position. The electrical triggering device is electrically coupled to the acceleration measuring device. The triggering device is also electrically coupled to the electromechanical actuator. The triggering device is adapted to activate the electromechanical actuator based, at least in part, on an output signal received from the acceleration measuring device. The ratchet mechanism is adapted to be mechanically coupled to a movable unsprung mass portion and to a sprung mass portion of the vehicle when the vehicle stability control system is operably installed on the vehicle. The ratchet mechanism includes a set of ratchet teeth, such that the ratchet mechanism is adapted to restrict a movement of the unsprung mass portion away from the sprung mass portion when the electromechanical actuator moves the tongue member toward the second tongue position and into the set of ratchet teeth. The acceleration measuring device may include a semiconductor accelerometer adapted to provide a voltage output proportional to a measured acceleration.

In accordance with still another aspect of the present invention, a vehicle stability control system is provided, which includes a first slider mechanism, an acceleration measuring device, and a triggering device. The first slider mechanism includes: a first slider portion; a second slider portion slidably coupled to the first slider portion; a first connector member extending from the first slider portion, the first connector member being adapted to be mechanically coupled to at least one of a sprung mass portion of a vehicle and an unsprung mass portion of the vehicle, wherein a vehicle spring is biased between the sprung mass portion and the unsprung mass portion of the vehicle; a second connector member extending from the second slider portion, the second connector member being adapted to be mechanically coupled to at least one of the unsprung mass portion of the vehicle and the sprung mass portion of the vehicle; a series of teeth formed along the first slider portion; and a movable tongue system comprising a moveable tongue member, the movable tongue system being attached to the second slider portion, the movable tongue system being adapted to position the tongue member in a first tongue position and a second tongue position. In the first tongue position, the tongue member being adapted to be located between at least some adjacent teeth of the series of teeth, such that the first slider portion may slide relative to the second slider portion as the unsprung mass portion moves toward the sprung mass portion of the vehicle, but such that the first slider portion is prevented from sliding relative to the second slider portion as the unsprung mass portion moves away the sprung mass portion of the vehicle. In the second tongue position, the tongue member does not prevent sliding of the first slider portion relative to the second slider portion. The acceleration measuring device is adapted to output a first electrical signal corresponding to an acceleration measurement. The triggering device is electrically connected to the acceleration measuring device and the movable tongue system. The triggering device is adapted to send a second electrical signal to the movable tongue system based upon the first electrical signal. The vehicle stability control system may further include a second slider mechanism that is essentially the same as the first slider mechanism (e.g., right side mechanism and left side mechanism). The acceleration measuring device and the triggering device may be part of a same electrical component. The triggering device may be part of the movable tongue system. The first connector member may be adapted to be mechanically coupled to the unsprung mass portion of the vehicle. The second connector member may be adapted to be mechanically coupled to the sprung mass portion of the vehicle. The first slider portion may have an elongated body. The second slider portion may have a hollow elongated body. The first slider portion slidably may mate with the second slider portion and slide at least partially into the second slider portion when the unsprung mass portion moves toward the sprung mass portion of the vehicle. At least some of the series of teeth may have a top side and a bottom side, where the top side is beveled at an angle relative to an axis of sliding for the first slider portion, and the bottom side is substantially perpendicular to the axis of sliding for the first slider portion. At least some of the series of teeth may have a top side and a bottom side, where the top side has a curved profile, and the bottom side is substantially perpendicular to an axis of sliding for the first slider portion. At least some of the series of teeth may have a rectangular profile. A distal end of the tongue member may have a bottom side that is beveled at an angle relative to an axis of sliding for the first slider portion. A distal end of the tongue member may have a bottom side that has a curved profile. The tongue member may have a rectangular distal end profile. The movable tongue system may include a solenoid for driving movement of the tongue member between the first and second tongue positions.

In accordance with another aspect of the present invention, a vehicle stability control system is provided, which includes an elongated hollow member, an elongated shaft member, a series of teeth, an electromechanical actuator, a tongue member, and an electrical circuit. The elongated hollow member has a first hole formed in a side thereof and has an open end. The elongated shaft member is slidably engaged into the open end of the hollow member. The series of teeth is formed along the shaft member. The electromechanical actuator is attached to the hollow member. The tongue member extends from the electromechanical actuator at the first hole. The electrical circuit includes an acceleration measuring device. The electrical circuit is electrically coupled to the electromechanical actuator. The series of teeth may include a series of recesses formed in the elongated shaft member comprising a profile shape selected from the group consisting of a triangular shape, a trapezoidal shape, a right angle, a convex curve, and a concave curve. The electromechanical actuator may include a solenoid.

In accordance with another aspect of the present invention, a vehicle having a vehicle stability control system installed thereon is provided, which includes a vehicle wheel, a vehicle suspension component, a spring, an elongated hollow member, an elongated shaft member, a series of teeth, an electromechanical actuator, a tongue member, and an electrical circuit. The vehicle wheel is rotatably coupled to the vehicle at least partially by the vehicle suspension component. The spring extends between the vehicle suspension component and a sprung mass portion of the vehicle. The elongated hollow member has a first hole formed in a side thereof and has an open end. The elongated hollow member is mechanically coupled to the sprung mass portion or the vehicle suspension component. The elongated shaft member is slidably engaged into the open end of the hollow member. The elongated shaft member is mechanically coupled to the vehicle suspension component or the sprung mass portion. The elongated shaft member is mechanically coupled to the vehicle suspension component if the elongated hollow member is mechanically coupled to the sprung mass portion. Or, the elongated shaft member is mechanically coupled to the sprung mass portion if the elongated hollow member is mechanically coupled to the vehicle suspension component. The series of teeth is formed along the shaft member. The electromechanical actuator is attached to the hollow member. The tongue member extends from the electromechanical actuator at the first hole. The electrical circuit includes an accelerometer device, a microprocessor, and an amplifier. The electrical circuit is electrically coupled to the electromechanical actuator. The accelerometer is electrically coupled to an input pin of the microprocessor. The amplifier is electrically coupled to an output pin of the microprocessor. The vehicle suspension component may be part of a rear transaxle assembly. The vehicle suspension component may include a lower control arm of an independent suspension system. The sprung mass portion may include a vehicle frame. The sprung mass portion may include a vehicle body. The sprung mass portion may include a shock tower.

In accordance with another aspect of the present invention, a method of limiting a movement of a sprung mass portion of a vehicle relative to an unsprung mass portion of the vehicle is provided. This method includes the following steps described in this paragraph. The order of the steps may vary, may be sequential, may overlap, may be in parallel, and combinations thereof, if not otherwise stated. A movable tongue member of a vehicle stability control system moves from a first tongue position toward a second tongue position. The tongue member engages teeth of a ratchet mechanism, the ratchet mechanism being part of the vehicle stability control system. The ratchet mechanism is mechanically coupled to the unsprung mass portion and to the sprung mass portion of the vehicle. When the tongue member engages the teeth, the ratchet mechanism restricts a movement of the unsprung mass portion away from the sprung mass portion. The tongue member does not restrict the movement of the unsprung mass portion relative to the sprung mass portion when the tongue member is in the first tongue position.

In accordance with yet another aspect of the present invention, a method of limiting expansion of a spring member on a vehicle is provided. This method includes the following steps described in this paragraph. The order of the steps may vary, may be sequential, may overlap, may be in parallel, and combinations thereof, if not otherwise stated. The spring member is biased between a sprung mass portion of the vehicle and an unsprung mass portion of the vehicle. A tongue member is moved from a first tongue position toward a second tongue position. A set of ratchet teeth is engaged with the tongue member as the tongue member is moved toward a second tongue position. The ratchet teeth are part of a ratchet mechanism. The ratchet mechanism being mechanically coupled to the sprung mass portion and to the unsprung mass portion of the vehicle. A movement of the unsprung mass portion away from the sprung mass portion is restricted when the tongue member is moved toward the second tongue position and into the set of ratchet teeth. The moving of the tongue member from the first tongue position toward the second tongue position may be performed after steps comprising: receiving an output signal from a signal generating device; determining whether the output signal meets or exceeds a predetermined threshold level; and if the output signal meets or exceeds the predetermined threshold level, activating an electromechanical actuator, wherein the electromechanical actuator is used for the moving of the tongue member. The signal generating device may be an accelerometer, and the method may further include measuring a lateral acceleration of the vehicle with the accelerometer, wherein the output signal corresponds to a lateral acceleration of the vehicle. The method may further include measuring a velocity of the vehicle with a sensor, wherein the activating of the electromechanical actuator is only performed if the velocity is above a predetermined velocity level. The method may further include measuring a movement of a steering wheel on the vehicle with a sensor, wherein the output signal corresponds to the movement of the steering wheel as a function of time. The method may further include measuring a velocity of the vehicle with a sensor, wherein the output signal corresponds to the movement of the steering wheel as a function of time. The method may further include measuring a tilt angle of a body of the vehicle relative to a ground surface with one or more sensors, wherein the output signal corresponds to the tilt angle of the vehicle. The method may further include measuring a tilt angle of a body of the vehicle relative to one or more vehicle wheels with one or more sensors, wherein the output signal corresponds to the tilt angle of the vehicle. The electromechanical actuator may include a component selected from the group consisting of an electric motor, a solenoid, an electrically-switchable hydraulic valve, a hydraulic actuator, an electrically-switchable pneumatic valve, a pneumatic actuator, an electrically-switchable vacuum valve, a vacuum-driven actuator, an electrically-switchable pyrotechnic-driven actuator, an electrically-switchable explosive-charged actuator, an electrically-switchable compressed-gas-driven actuator, and combinations thereof, for example. The determining whether the output signal meets or exceeds the predetermined threshold level may be performed by an electrical circuit comprising a component selected from the group consisting of a microprocessor, a capacitor, a resistor, a transistor, an analog electrical circuit, an analog-to-digital converter, a digital-to-analog converter, an amplifier, and combinations thereof. At least some of the ratchet teeth may be formed along a curved path. At least some of the ratchet teeth may be formed along a linear path. The ratchet mechanism may include a first slider portion, and a second slider portion slidably coupled to the first slider portion. The ratchet mechanism may be attached to and part of a shock absorber device. The ratchet mechanism may include a ratchet gear extending from a suspension arm and extending circumferentially at least partially around a pivot axis of the suspension arm, wherein the ratchet gear is fixed relative to the suspension arm and adapted to pivot with the suspension arm about the pivot axis. The ratchet mechanism may include a first arm; a second arm pivotably coupled to the first arm, at least part of the movable tongue system being attached to the second arm; and a tooth arm extending from the first arm, the tooth arm having the set of ratchet teeth thereon, and the tooth arm extending across at least part of the movable tongue system when the vehicle stability control system is operably installed on the vehicle.

In accordance with still another aspect of the present invention, a method of limiting expansion of a spring member on a vehicle is provided. This method includes the following steps described in this paragraph. The order of the steps may vary, may be sequential, may overlap, may be in parallel, and combinations thereof, if not otherwise stated. Lateral acceleration of the vehicle is measured. It is determined whether the lateral acceleration of the vehicle exceeds a predetermined threshold level. If the lateral acceleration exceeds the predetermined threshold level, then for a predetermined period of time, allowing the spring member to be compressed when the unsprung mass portion moves toward the sprung mass portion, but not allowing the spring member to expand. The measuring lateral acceleration may be performed by an accelerometer. The determining whether the lateral acceleration of the vehicle exceeds a predetermined threshold level may be performed by a microprocessor. The determining whether the lateral acceleration of the vehicle exceeds a predetermined threshold level may be performed by analog electrical circuitry. The analog electrical circuitry may include a resistor, a capacitor, and a transistor. In one application, the method may be performed only if the vehicle is moving at a speed greater than a predetermined speed level, and wherein the method further comprises measuring and monitoring the speed of the vehicle. The predetermined threshold level for lateral acceleration may be about 0.2 g (or about 6.4 ft/sec$^2$) and the predetermined speed level is about 30 miles per hour. The predetermined period of time may be about 1 second, for example. The method may include allowing the spring member to be compressed when the unsprung mass portion moves toward the sprung mass portion, but not allowing the spring member to expand, which includes: activating an electromechanical actuator of a movable tongue system; and using the electromechanical actuator, moving a tongue member of the movable tongue system toward a first slider portion of a first slider mechanism and into a series of teeth formed along the first slider portion, wherein the first slider portion is slidably coupled to a second slider portion of the first slider mechanism, and wherein the movable tongue system is attached to the second slider portion.

In accordance with another aspect of the present invention, a method of improving vehicle stability during abrupt turning maneuvers is provided. This method includes the following steps described in this paragraph. The order of the steps may vary, may be sequential, may overlap, may be in parallel, and combinations thereof, if not otherwise stated. A lateral acceleration measurement of a vehicle is obtained. If the lateral acceleration measurement exceeds a predetermined lateral acceleration level, then for a predetermined period of time, an electromechanical actuator is activated. The electromechanical actuator is part of a moveable tongue system. The moveable tongue system further includes a tongue member. Using the electromechanical actuator when activated, the tongue member is driven against a first slider portion of a first slider mechanism at a location upon a path of movement for a series of teeth formed along the first slider portion. The first slider portion is slidably coupled to a second slider portion of the first slider mechanism. The movable tongue system is attached to the second slider portion. The first slider mechanism is mechanically coupled between a sprung mass portion and an unsprung mass portion of the vehicle. A vehicle wheel is rotatably coupled to the unsprung mass portion. A spring member is biased between the sprung mass portion and the unsprung mass portion of the vehicle. When the tongue member is driven against the first slider portion and when the tongue member engages into the series of teeth, the spring member is prevented from expanding. The tongue member may be driven against the first slider portion and when the tongue member engages into the series of teeth, allowing the spring member to be compressed. The obtaining the lateral acceleration measurement may be performed by an acceleration measuring device comprising an accelerometer. The determining if the lateral acceleration measurement exceeds the predetermined lateral acceleration level may be performed by a triggering device comprising a microprocessor.

The foregoing has outlined rather broadly features of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The following is a brief description of the drawings, which illustrate exemplary embodiments of the present invention and in which.

DETAILED DESCRIPTION OF ILLUSTRATIVE EMBODIMENTS

Figure 1A:
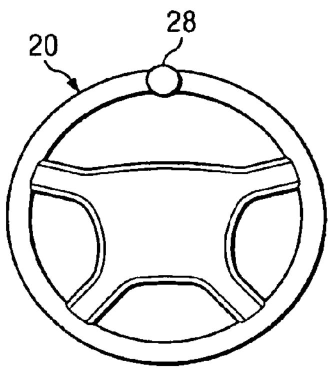
FIGS. 1A–4 illustrate a fish-hook maneuver for a stock test vehicle without using an embodiment of the present invention.

Referring now to the drawings, wherein like reference numbers are used herein to designate like or similar elements throughout the various views, illustrative embodiments of the present invention are shown and described. The figures are not necessarily drawn to scale, and in some instances the drawings have been exaggerated and/or simplified in places for illustrative purposes only. One of ordinary skill in the art will appreciate the many possible applications and variations of the present invention based on the following illustrative embodiments of the present invention.

Generally, an embodiment of the present invention may be used to improve the handling and stability of a vehicle during a severe turning maneuver or an emergency steering maneuver. In a preferred embodiment, a system of the present invention may be activated when a severe turning maneuver or an emergency steering maneuver is sensed. Thus, during most normal driving situations the system would simply monitor certain conditions of the vehicle and remain inactive (i.e., not interfering with the stock suspension functions of the vehicle). These and other aspects of illustrative embodiments of the present invention will be described next.

Figure 2A:
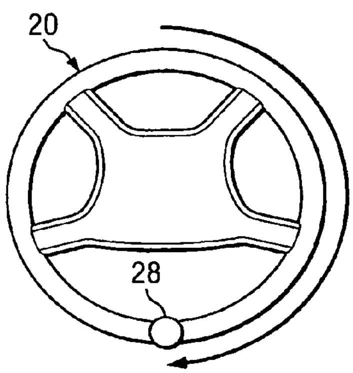
Figure 2B:
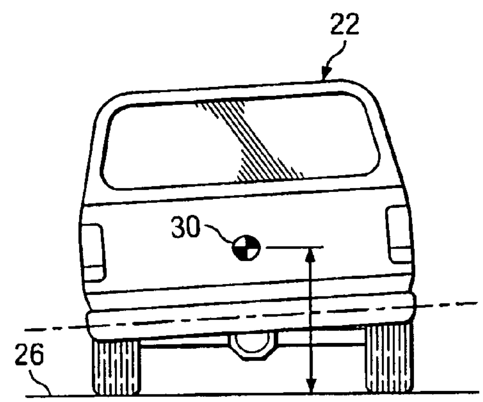
Figure 3A:
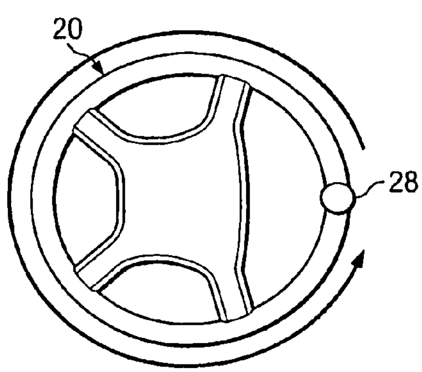
Figure 3B:
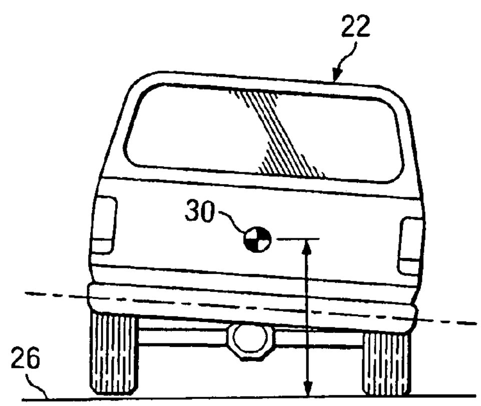
Figure 4:
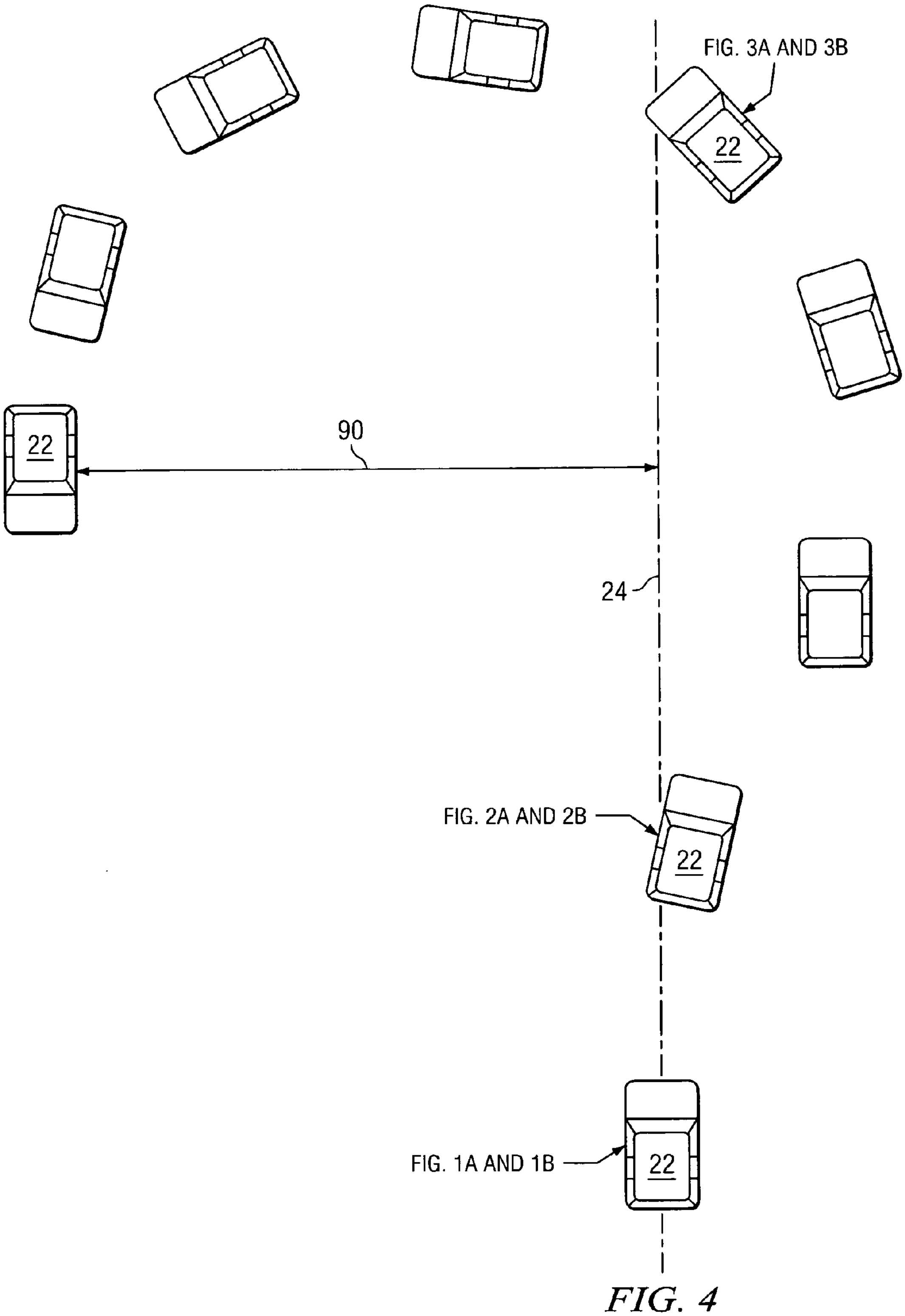

FIGS. 1A–4 illustrate a fish-hook maneuver, which is similar to a dynamic rollover testing maneuver adopted by the National Highway Traffic Safety Administration (NHTSA) in 2003 to evaluate and rate vehicles for rollover potential. FIGS. 1A, 2A, and 3A illustrate the movement of the vehicle's steering wheel 20 during a fish-hook maneuver. FIGS. 1B, 2B, and 3B illustrate rear views of a typical sport utility vehicle (SUV) 22 (without using an embodiment of the present invention) corresponding to the different stages of the fish-hook maneuver and corresponding to the steering wheel positions of FIGS. 1A, 2A, and 3A. FIG. 4 is a plan view illustrating the motion of the SUV 22 during the fish-hook maneuver.

Figure 1B:
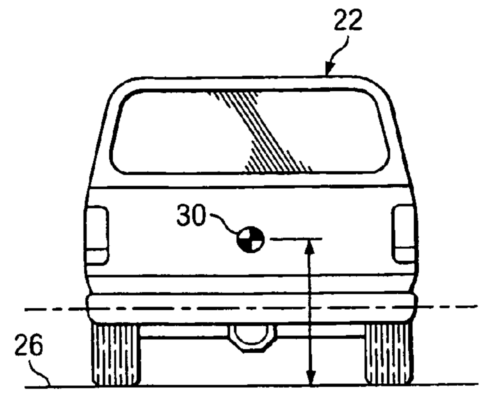

An actual fish-hook maneuver rollover test is typically performed at a testing facility having a large, flat, level skid pad area with a straight runway leading to the skid pad area. Also, the vehicle 22 typically has outriggers (not shown) installed thereon to prevent the vehicle 22 from actually rolling over when a rollover would otherwise occur. To perform a fish-hook maneuver, the test driver begins by driving along a straight line (see e.g., line 24 of FIG. 4) at some predetermined speed (e.g., 35–50 mph). Thus, at this stage the steering wheel 20 is held straight, as shown in FIG. 1A, and the vehicle 22 is level relative to the ground surface 26, as shown in FIG. 1B. In this example, the vehicle 22 is traveling at 45 mph.

Next, the steering wheel 20 is quickly and abruptly (preferably as fast as humanly possible) turned to the right 180 degrees, as shown in FIG. 2A. In this fish-hook test, the driver removes his foot from the gas pedal at the same time the right turn is initiated, and the gas and brake pedals are not pressed throughout the remainder of the fish-hook maneuver. Often the steering wheel 20 will have a knob 28 pivotably attached thereto, as shown in FIGS. 1A, 2A, and 3A, during testing to allow the driver to turn the steering wheel 20 faster. As the vehicle 22 turns to the right side, the centrifugal force of the turn exerts a lateral acceleration on the vehicle body. This centrifugal force causes the vehicle body to lean and tilt downward on the left side, compressing the rear springs on the left side. This is illustrated in FIG. 2B. Often the right side will be raised during this tilting, as shown in FIG. 2B. Note the tilt angle of the SUV 22 in FIG. 2B and note that the center of gravity 30 is raised (as compared to FIG. 1B). In other vehicles, the center of gravity 30 (at this stage) may be raised, lowered, or remain about the same, depending on the springs and shocks of the vehicle 22.

Just as the steering wheel 20 reaches the 180 degree position shown in FIG. 2A, the driver immediately and quickly turns the steering wheel 20 as far as possible in the opposite direction (e.g., about 450 degrees, depending on the vehicle), as shown in FIG. 3A. Referring again to FIG. 4, the vehicle 22 then proceeds to turn left until it stops. As the vehicle 22 begins to turn left, the weight of the sprung mass of the vehicle 22 (e.g., frame and body) is rapidly shifted to the right side, as shown in FIG. 3B. This reverses the downward force that was compressing the left-side springs, and the left-side springs begin expanding towards the preloaded level (see FIG. 1B). Hence, the potential energy that was stored in the left-side spring is quickly released as the weight of the vehicle is quickly shifted toward the right side. The left-side spring then pushes up on the left side of the vehicle frame (on the inside of the turn), only limited by the dampening effect of the shock absorbers and the counter spring force of the anti-sway bar (if any). This force exerted on the left side of the vehicle 22 adds to the weight transfer and tilting toward the right side caused by the centrifugal force. This spring force from the left side helps to overcome the inertia of the prior left-side weight transfer to build momentum in the tilting toward the right side. This tilting momentum can then be easily maintained by the centrifugal force toward the right side, as well as the forward momentum of the vehicle 22, and generate a rollover situation. Note also in FIG. 3B that the center of gravity 30 of the vehicle is further raised. Raising the center of gravity 30 of a vehicle 22 generally worsens its handling abilities and decreases its stability. As the center of gravity 30 is raised, the moment arm between the center of gravity 30 and the tilt center point is increased, which makes it easier to roll over the vehicle 22 for a given centrifugal force acting on the center of gravity 30 (i.e., more leverage provided).

There are different types of fish-hook maneuver tests, including the Roll Rate Feedback Fishhook and the Fixed Timing Fishhook (among others). The most common scenario leading to untripped rollover, according to NHTSA is when a driver, through fatigue or distraction allows the right wheels to drop off the right pavement edge. The driver attempts to get back on the paved roadway by abruptly steering to the left. The lip between the pavement and shoulder may require a substantial steer angle to rise out of the drop-off lip. Once the vehicle overcomes the lip, the driver may not anticipate the quick directional change to the left once the vehicle is on full pavement. The driver then rapidly counter-steers to the right in an attempt to recover. The Roll Rate Maneuver format takes into account an individual vehicle's handling characteristics, while the Fixed Time format does not. The Roll Rate format, according to NHTSA reports, appears to be more acceptable because it accounts for the different weight and handling characteristics of each make and model. Both maneuvers may be conducted with an automated steering controller, and the reverse steer of the fish-hook maneuver may be timed to coincide with the maximum roll angle to create an objective "worst case."

In the example of FIGS. 1A–4, an embodiment of the present invention may be used to prevent the left-side springs from adding to and/or initiating a tilt movement toward the right side. In addition, an embodiment of the present invention may be used to effectively stiffen the suspension and lower the center of gravity 30 of the vehicle 22, both of which may greatly improve the handling and stability of the vehicle 22 (especially an SUV or truck having a relatively high center of gravity compared to most cars).

Figure 5:
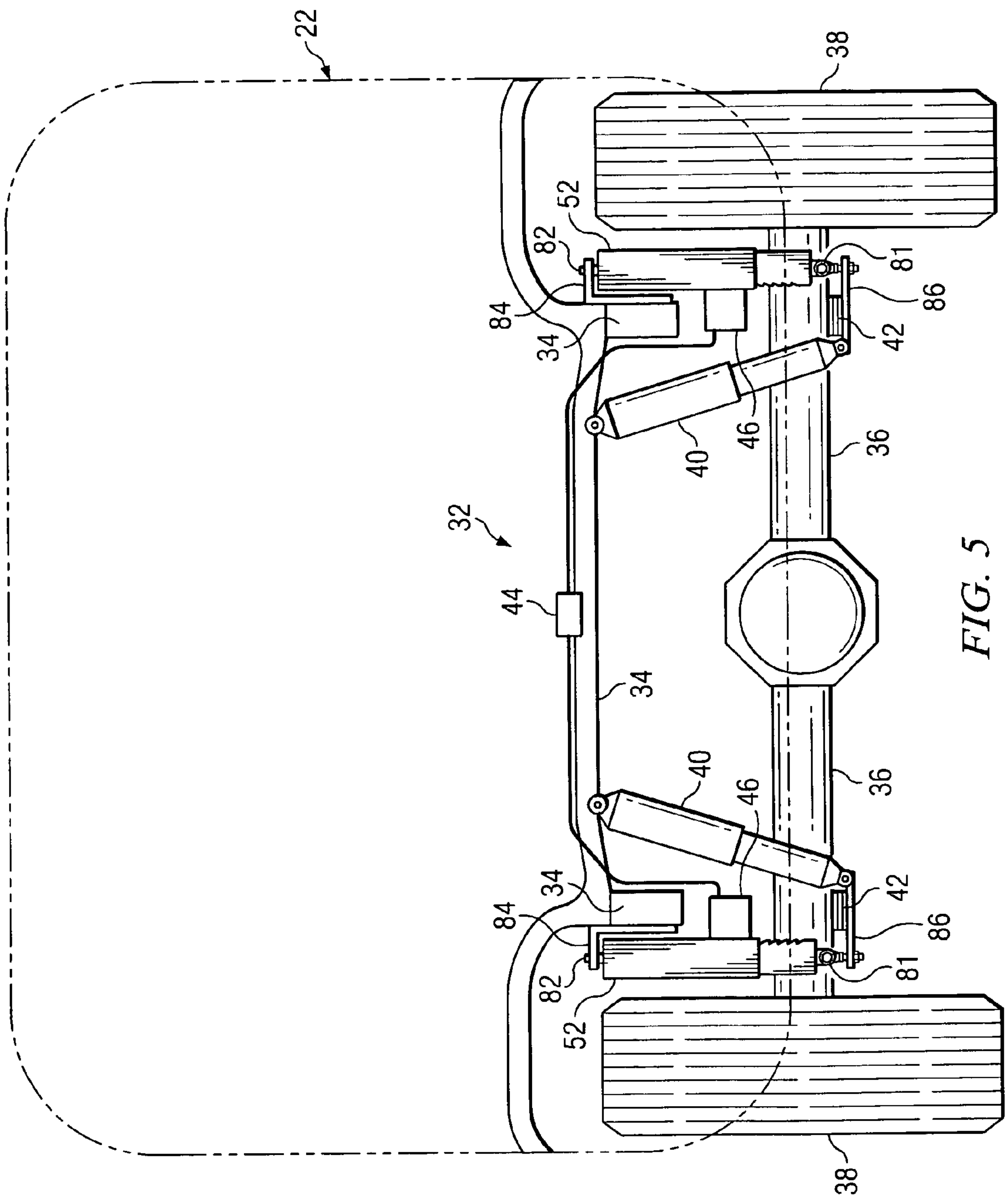
FIGS. 5–7 show various portions and various views of a first illustrative embodiment of the present invention.
Figure 6:
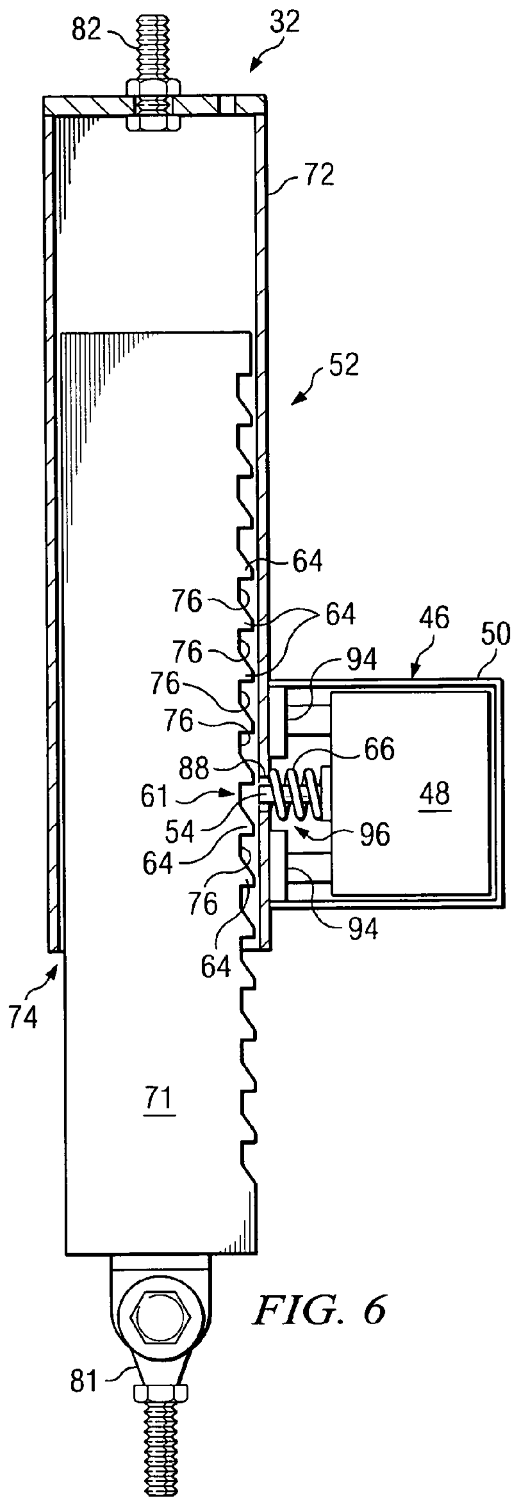
Figure 7:
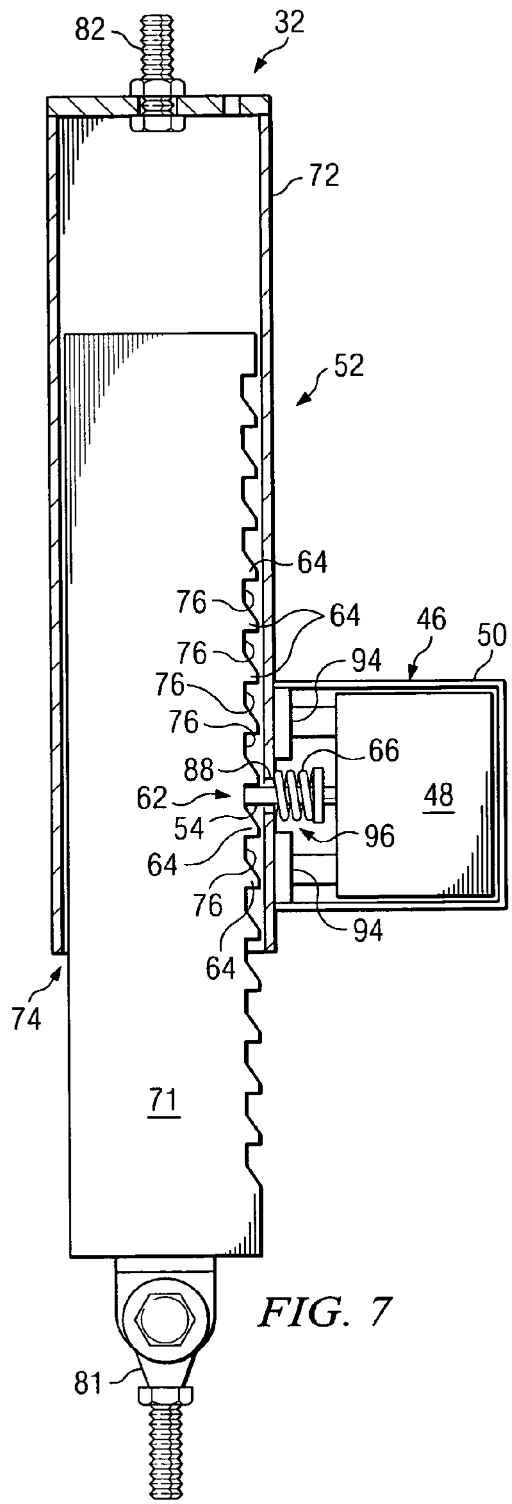

FIGS. 5–7 show various portions and various views of a first illustrative embodiment of the present invention. FIG. 5 is a rear view of an SUV 22 having a vehicle stability control system 32 installed thereon, in accordance with the first illustrative embodiment of the present invention. Portions of the vehicle 22 are not shown or are shown in dashed lines to better illustrate the system 32 of the first embodiment. In FIG. 5, the following portions of the vehicle 22 are shown: part of the frame 34, the rear transaxle 36, the rear tires 38, the rear shocks 40, and a cross-section view of the rear springs 42.

A system 32 of a preferred embodiment includes a signal generating device, a triggering device, a movable tongue system, and a ratchet mechanism. In the first embodiment, an electrical device 44 includes a signal generating device and a triggering device. The electrical device 44 is electrically coupled to a movable tongue system 46. The signal generating device of the first embodiment includes an acceleration measuring device, such as a semiconductor accelerometer, for example. The accelerometer of the first embodiment is installed in a position to output a voltage signal corresponding to a lateral acceleration of the vehicle 22 (due to centrifugal force). As will be discussed below, other signal generating devices may be implemented in other embodiments of the present invention. The triggering device of the first embodiment includes a microprocessor and amplifiers. A voltage output of the accelerometer corresponding to a lateral acceleration measurement is electrically connected to an input of the microprocessor. The microprocessor includes an A/D converter and software. The A/D converter converts the analog signal output from the accelerometer to a corresponding digital signal. The software residing in the microprocessor includes logic to evaluate the lateral acceleration values. If the lateral acceleration meets or exceeds a predetermined threshold level (e.g., for a certain number of cycles), then the microprocessor changes its output to the amplifiers. The amplifiers raise the voltage and current to a level to activate the electro-mechanical actuator 48 of the movable tongue member 46 (described below). More details about the electrical device 44 will be described below, as well as some possible variations on the signal generating device and the triggering device.

The movable tongue system 46 is attached to the ratchet mechanism 52 in FIGS. 5–7. The movable tongue system of the first embodiment includes a movable tongue member 54 and an electromechanical actuator 48. A cover 50 of the movable tongue system 46 is broken away in FIGS. 6 and 7 to reveal the components therein. There are many possible variations and alternatives for the tongue member 54 and the electromechanical actuator 48, as will be discussed below.

FIGS. 6 and 7 are cross-section views showing the movable tongue system 46 and the ratchet mechanism 52 of the first illustrative embodiment for the left side of the vehicle 22 (see also in FIG. 5). The electromechanical actuator 48 of the first embodiment includes a solenoid. The solenoid 48 is electrically coupled to the electrical device 44 (see FIG. 5), and is mechanically coupled to the tongue member 54 (see FIGS. 6 and 7). The solenoid 48 is used to move the tongue member 54 from a first tongue position 61 to or toward a second tongue position 62. In FIG. 6, the tongue member 54 is shown in the first tongue position 61 (retracted), and the tongue member 54 of FIG. 7 is shown in the second tongue position 62 (engaging the teeth 64). When the solenoid 48 is not activated by the electrical device 44, a tongue spring 66 biases the tongue member 54 to or toward the first tongue position 61 (see FIG. 6).

The ratchet mechanism 52 of the first embodiment has a first slider portion 71 and a second slider portion 72. The second slider portion 72 in this case is an elongated hollow member having an open end 74. The first slider portion 71 in this case is an elongated shaft member. A series of teeth 64 are formed along the shaft member 71. These teeth 64 are formed by a series of recesses 76 formed in the elongated shaft 71. In the first embodiment, the teeth 64 have a beveled side and a flat side, to provide the ratcheting function for this case. The distal end of the tongue member 54 for the first embodiment has a rectangular-shaped profile and is adapted to fit into the recesses 76 between the teeth 64, as shown in FIG. 7. When the solenoid 48 drives the tongue member 54 toward the second tongue position 62 and into the series of teeth 64, the ratchet mechanism 52 is permitted to be compressed but is restricted from expanding.

Still referring to FIGS. 6 and 7, a first connector member 81 is attached to and extends from the first slider portion 71. Similarly, a second connector member 82 is attached to and extends from the second slider portion 72. In this example, the second connector member 82 is a bolt extending through an end of the elongated hollow member 72 and held in place by a corresponding nut. The first connector member 81 in this example is a Heim joint connector bolted to a bracket extending from an end of the shaft member 71. Referring again to FIG. 5, the second connector member 82 is bolted to a frame bracket 84, which is attached to a frame rail 34 of the vehicle 22. In other embodiments, the frame bracket 84 may be an integral part of the vehicle frame 34. The frame bracket 84 preferably bolts to the frame 34 in an aftermarket installation. However, the frame bracket 84 may be attached to the frame 34 in other ways (e.g., welded). In some embodiments, a frame bracket 84 may not be needed (e.g., when ratchet mechanism 52 attaches directly to frame, body, or shock tower of the vehicle 22). The first connector member 81 of the first embodiment is bolted to a leaf spring bracket 86, which is a suspension component in this case. The SUV 22 of FIG. 1 has leaf springs 42. Only cross-section views of the leaf springs 42 are shown in FIG. 5. As is a typical configuration, a vehicle shock absorber 40 (dampener) is also attached between the vehicle frame 34 and the leaf spring bracket 86. Thus, the ratchet mechanism 52 is mechanically coupled between a sprung mass portion of the vehicle 22 and a movable unsprung mass portion of the vehicle 22. In this case, the unsprung mass portion includes a rear transaxle assembly 36, as is common on many SUVs and trucks.

It should also be noted that the ratchet mechanism 52 of the first embodiment may be flipped. That is, the shaft member 71 may be mechanically coupled to the sprung mass portion of the vehicle 22, and the hollow member 72 may be mechanically coupled to the unsprung mass portion in other embodiments.

Still referring to FIGS. 5–7, the tongue member 54 extends through a side hole 88 formed in the side of the elongated hollow member 72 when the tongue member 54 is in the second tongue position 62 (see FIG. 7). Referring to FIG. 6, when the tongue member 54 is retracted by the tongue spring 66 expanding (i.e., not extending past the side hole 88 in this case) (when the solenoid 48 is not activated), the first slider portion (shaft member 71) is free to slide into and out of the second slider portion (elongated hollow member 72). Thus, in the configuration of FIG. 6, the system 32 of the first embodiment does not hinder the movement and motion of the unsprung mass portion relative to the sprung mass portion of the vehicle 22, and the shaft member 71 freely slides within the elongated hollow member 72, as a slider mechanism. But when the solenoid 48 is activated (energized) to drive the tongue member 54 toward the second tongue position 62, the tongue member 54 slides into a recess 76 and engages the series of teeth 64. The beveling of the teeth 64 allow a sufficient compressive force exerted on the ratchet mechanism 52 to force the tongue member 54 toward the first tongue position 61 as it slides along the beveled side of a tooth 64. But the tongue member 54 engaging the flat side of the tooth 64 (see FIG. 7) prevents the shaft member 71 from being pulled out of the hollow member 72. The functions of these actions will be explained next with regard to FIGS. 8A–11 and continuing reference to the first embodiment of FIGS. 5–7.

Figure 8A:
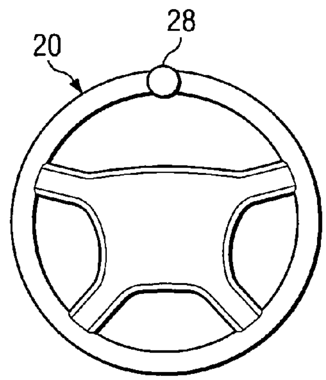
FIGS. 8A–11 illustrate a fish-hook maneuver test while using the first embodiment of the present invention.
Figure 8B:
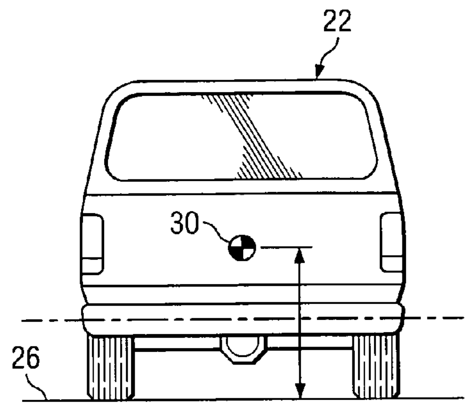

FIGS. 8A–11 illustrate the same fish-hook maneuver test described above with reference to FIGS. 1A–4, but with the use of the first embodiment of the present invention. As will be shown, having the system 32 of the first embodiment operably installed on the vehicle 22, as shown in FIG. 5, improves the stability and controllability of the vehicle 22. In this example, the system 32 is only installed on the rear suspension of the vehicle 22. In other embodiments (not shown), the system 32 may be installed on the front and rear suspensions, or only on the front suspension, for example. FIGS. 8A and 8B are the same as FIGS. 1A and 1B, but with the system 32 on and not activated yet. In other words, the solenoid 48 is not activated and the tongue member 54 is in the first tongue position 61 (retracted), as shown in FIG. 6. For purposes of comparison, the same vehicle 22 is again traveling at 45 mph for the fish-hook maneuver, but with the system 32 of the first embodiment operably installed thereon. When the system is on, the accelerometer is continuously measuring the lateral acceleration of the vehicle 22 (corresponding to the centrifugal force experienced by the vehicle 22). Also, the microprocessor is continuously receiving and processing output signals from the accelerometer, to determine if the lateral acceleration has met or exceeded the predetermined threshold level. During normal driving conditions, the lateral acceleration rarely, if ever, exceeds the predetermined threshold level while the vehicle is traveling at high speeds (e.g., above 30–40 mph).

Figure 9A:
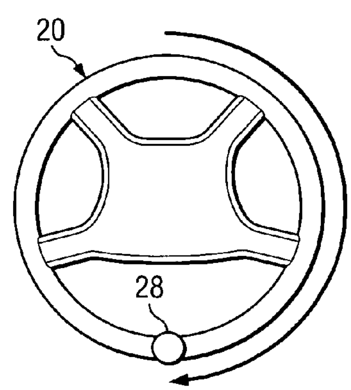
Figure 9B:
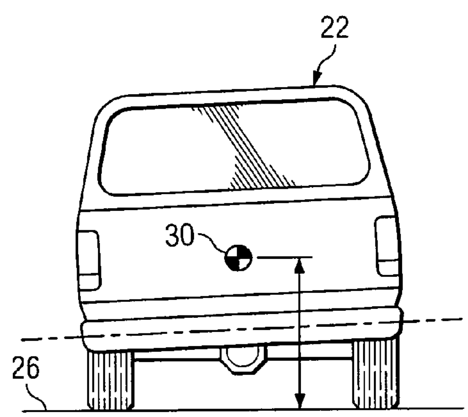
Figure 11:
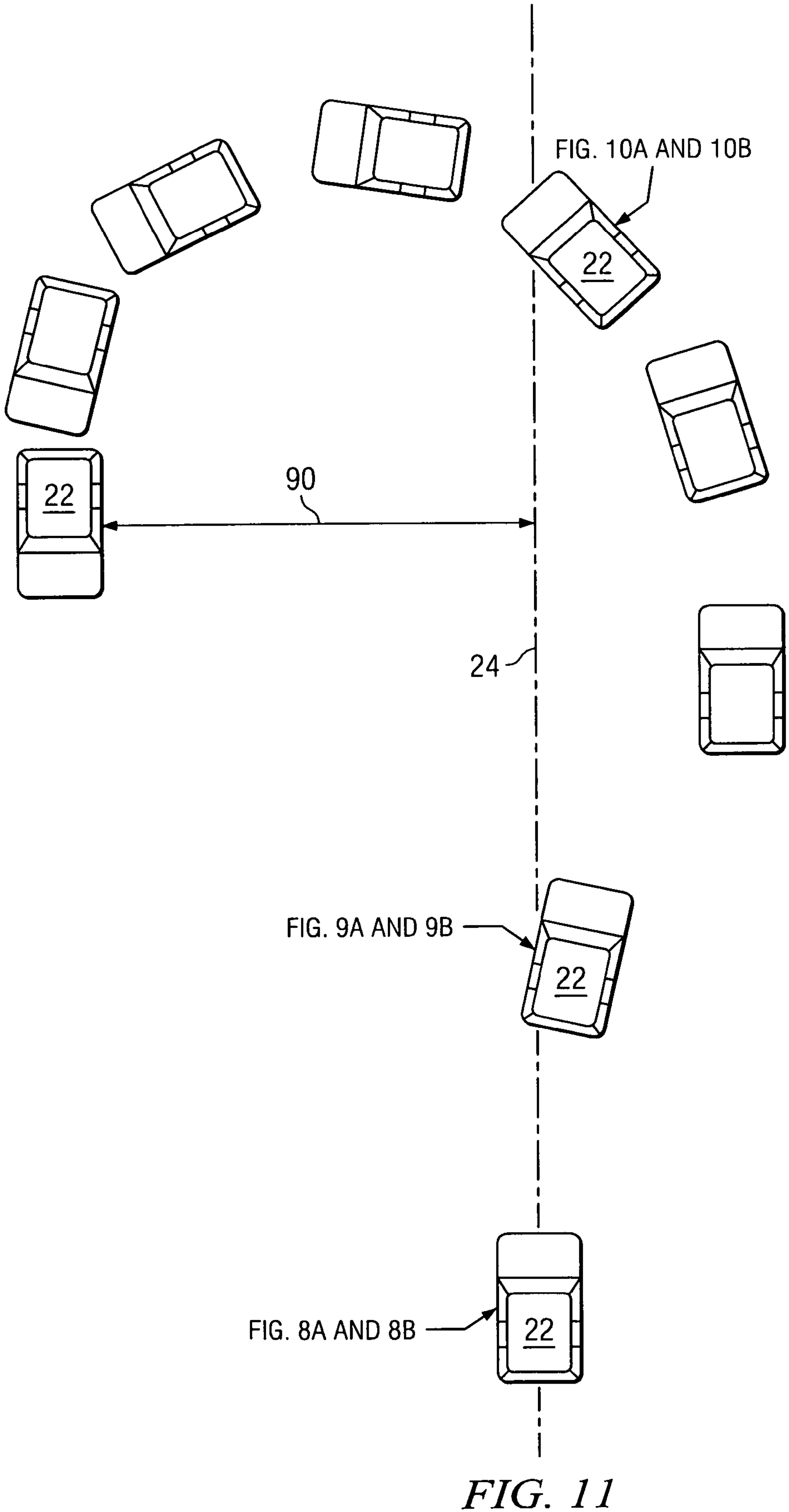

Referring now to FIGS. 9A, 9B, and 11, the steering wheel 20 is abruptly turned to the right 180 degrees. When the steering wheel 20 is quickly turned 180 degrees while the vehicle 22 is traveling 45 mph, for example, the centrifugal forces exerted on the vehicle body will generate a lateral acceleration measurement in the accelerometer that exceeds the threshold level, and thus, the system 32 is activated (triggered). The microprocessor then activates the solenoid 48 (via the amplifiers) as long as the lateral acceleration exceeds about 0.2 g, for example, and then for a predetermined amount of time (e.g., about 1 second). In other embodiments and applications, the lateral acceleration for activating the system 32 may be increased or decreased, and the predetermined amount of time may be increased or decreased, as needed or desired. The activated solenoid 48 drives tongue member 54 toward the second tongue position 62 (see FIG. 7). In the first embodiment, both sides are activated. On each side, the tongue member 54 engages the teeth 64 on the shaft member 71, and the ratchet mechanism 52 begins to limit the movement of the suspension. When the system 32 is activated, the suspension on each side is permitted to further compress, but the suspension is prevented from expanding on each side. In other words, the sprung mass portion is permitted to move toward the unsprung mass portion, but the sprung mass portion is not permitted to move away from the unsprung mass portion by the ratchet mechanisms 52. FIG. 9B may be the same or similar to FIG. 2B. The system 32 has the most effect on the vehicle 22 when the driver abruptly changes direction of steering, as when a driver in an emergency situation countersteers while trying to return to his/her lane, trying to avoid going off the road, and/or trying to avoid hitting another object (e.g., on coming traffic, another car, a person, an animal, a tree, a barrier, a wall, a guardrail, a ditch, etc.).

Figure 10A:
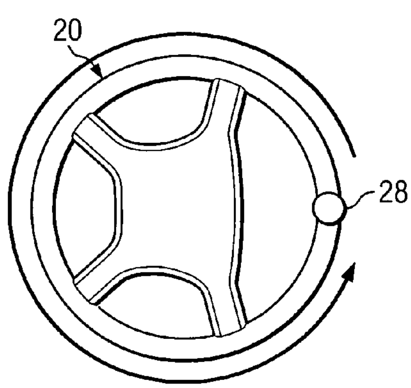
Figure 10B:
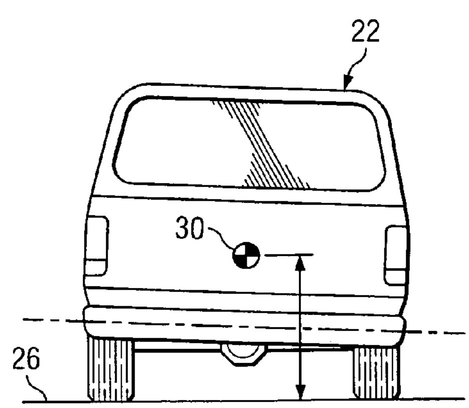

Returning again to the fish-hook maneuver at FIGS. 10A–11, the driver next turns the steering wheel 20 immediately and quickly in the opposite direction (left in this case) as far as possible (worst case). As the centrifugal force acting on the center of gravity 30 reverses direction and as the vehicle body weight is transferred toward the right side, the right side of the suspension begins to be compressed, as shown in FIG. 10B. Because the system is activated and the ratchet mechanisms 52 are preventing expansion of the rear suspension, the left side of the rear suspension is prevented from expanding and the left side of the vehicle 22 is not pushed upward by the left-rear leaf spring 42. Thus, the system 32 prevents the left-rear spring 42 from adding to the centrifugal forces tilting the vehicle 22 to the right side. Also, the system 32 prevents the center of gravity 30 from being raised (compare FIG. 10B to FIG. 3B), which improves the handling and stability of the vehicle 22 during this extreme maneuver. Furthermore, by keeping the springs 42 compressed, the rear suspension is effectively stiffened because the spring rate is increased as the springs 42 are compressed. By stiffening the rear suspension and lowering the center of gravity 30, the SUV 22 takes on handling characteristics more like a sports car. The result is better handling and more stability (as compared to the stock suspension).

Testing the system of the first embodiment on a 1991 Ford Explorer (the first test vehicle) revealed numerous advantages and benefits. For this first test vehicle, one leaf of the leaf spring was removed on each side of the rear suspension. The testing was performed by a unbiased and experienced professional test driver at the Continental Proving Grounds in Uvalde, Tex. Without the system 32 of the first embodiment on, the first test vehicle 22 reached rollover during a fish-hook maneuver at 45 mph (see FIG. 3B). During the testing, the first test vehicle 22 was prevented from actually rolling over by safety outriggers extending from the sides of the vehicle 22 (i.e., outriggers were touching the ground and inside wheels were off the ground). With the system 32 turned on, the first test vehicle 22 does not reach rollover during a fish-hook maneuver at 45 mph (see FIG. 10B) and the vehicle 22 is stable. A comparison of the paths traveled with and without the system 32 turned on (compare FIGS. 4 and 11) reveals a dramatic difference in the turning radius 90. In FIG. 4, without the system 32 turned on, the vehicle 22 had a turning radius 90 between about 131 feet and about 141 feet. In contrast, the results shown in FIG. 11 with the system 32 turned on, provided a turning radius 90 between about 79 feet and about 115 feet.

Further tests of the first test vehicle 22 at higher speeds with the system 32 turned off were not performed because the vehicle 22 was already reaching rollover at 45 mph. However, further tests of the first test vehicle 22 with the system 32 turned on were performed at much higher speeds, without rollover. As the speeds increased, the turning radius 90 tended to decrease dramatically and then slowly increase because the vehicle 22 began to experience rear wheel sliding, rather than rollover, which caused the back end of the vehicle 22 to come around at a sharper angle. Performing the same fish-hook maneuver test with the first test vehicle 22 at 50, 55, 60, 65, and 70 mph provided turning radiuses of about 82, 19, 24, 26, and 32 feet, respectively. Even at up to 70 mph, the first test vehicle 22 with the system 32 turned on did not reach rollover. Instead of rolling over at such higher speeds, the first test vehicle 22 tended to lose traction at the rear tires 38 and the rear tires 38 would slide, which is what a sports car would do in such a maneuver at high speed.

One phenomena discovered during testing of the first embodiment of FIGS. 5–7 on the first test vehicle 22 was that the leaf spring suspension of this vehicle 22 allowed the rear transaxle 36 to shift left (and right) relative to the vehicle frame and body during hard cornering. As a result, the outside tire of the vehicle 22 had a tendency to rub against the elongated hollow member 72 of the first embodiment (see FIG. 5). This created a braking effect on the rear outside tire during hard cornering, whether the system 32 was turned on or not, which was also improving the cornering of the first test vehicle 22 (as compared to the system 32 not being installed on the vehicle 22). It was also found that the tire 38 engaging the hollow member 72 kept the suspension from moving lateral any farther.

Figure 12:
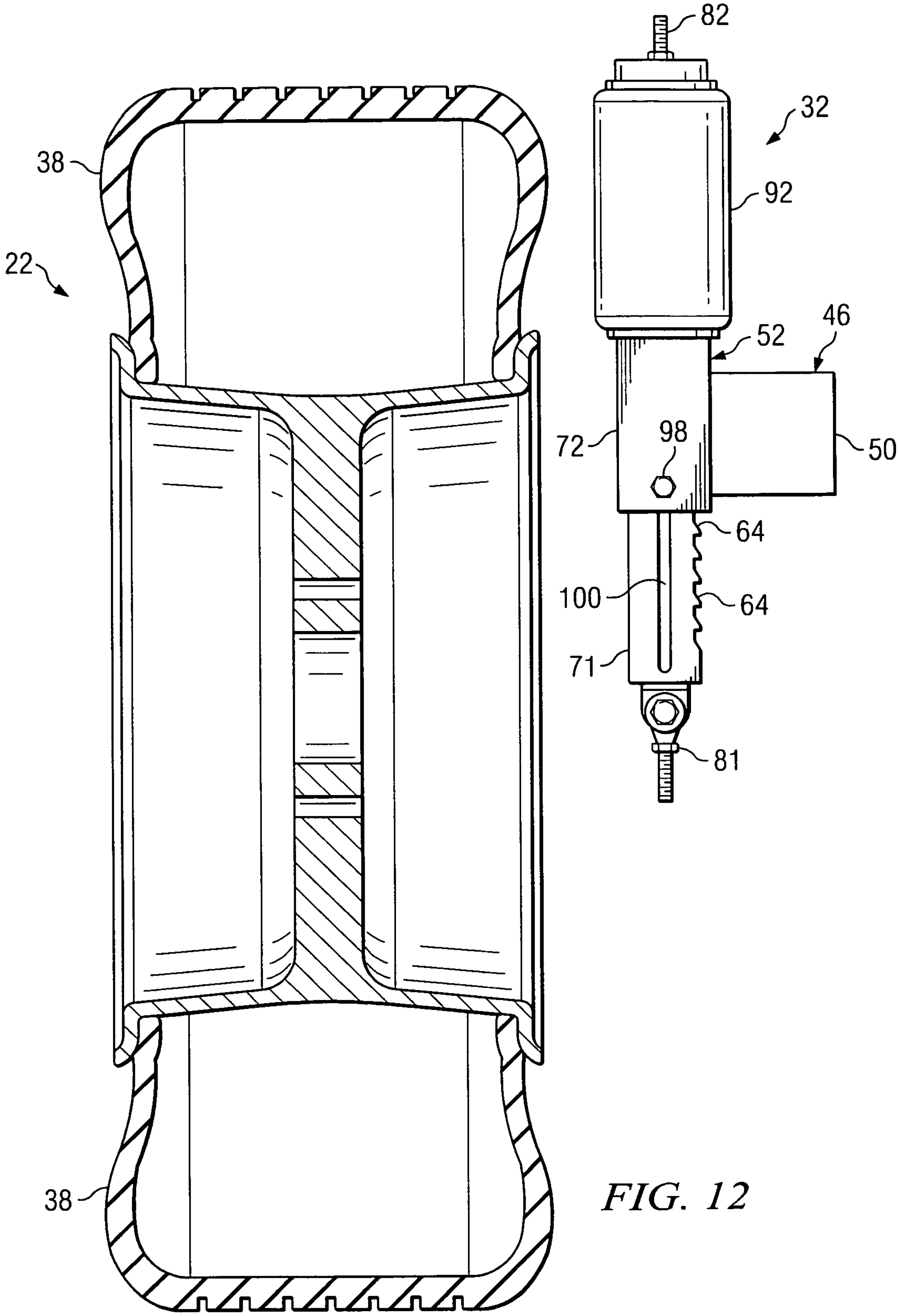
FIG. 12 shows a ratchet mechanism of a second illustrative embodiment of the present invention.
Figure 13:
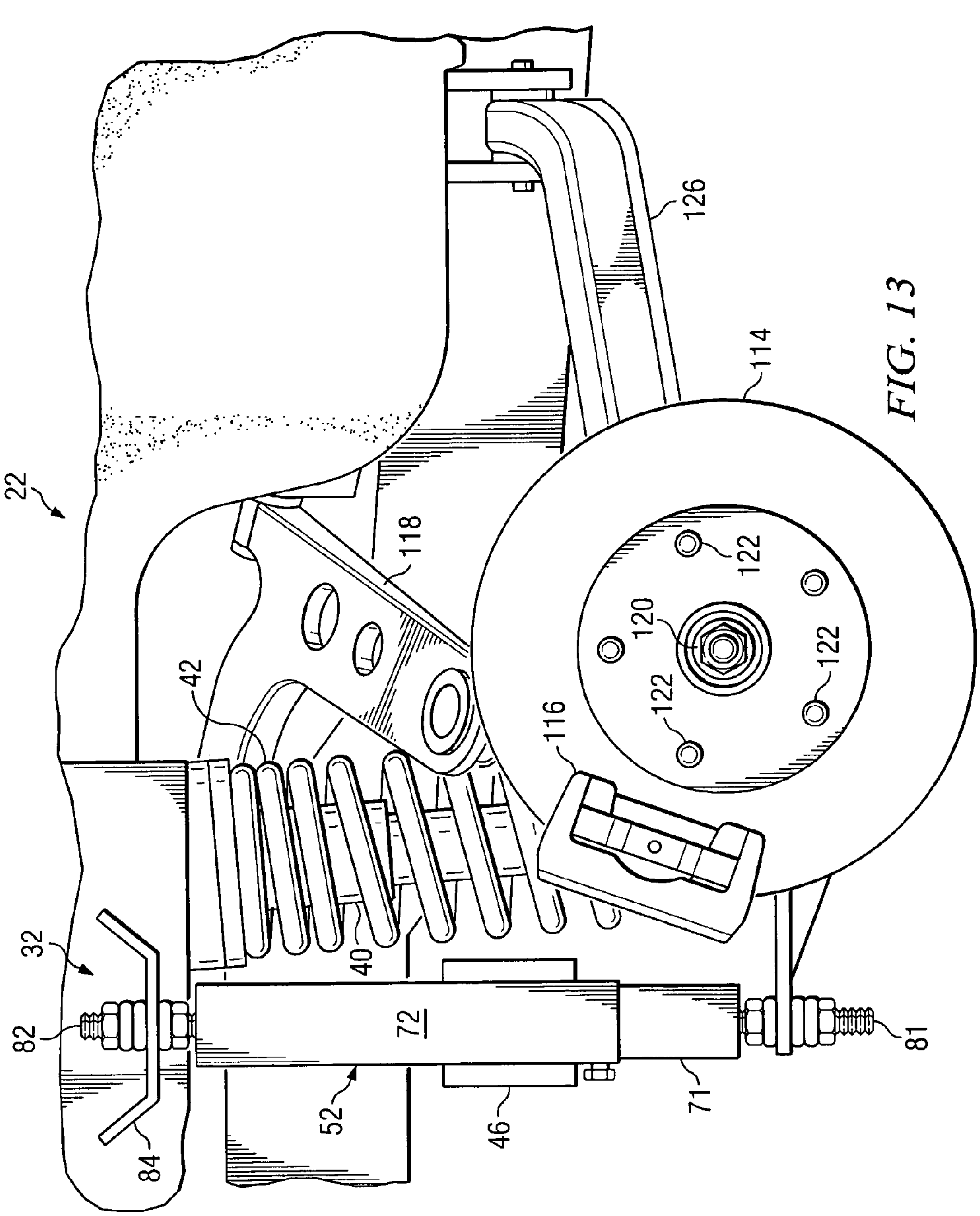
FIGS. 13–16 show various views of a third illustrative embodiment of the present invention.

FIG. 12 illustrates a second illustrative embodiment of the present invention, which may be used to address this situation where the rear suspension is permitted to shift laterally during hard cornering. The system 32 of the second embodiment in FIG. 12 is similar to the first embodiment of FIGS. 5–7, except that a roller member 92 has been added. The roller member 92 is rotatably coupled to the elongated hollow member 72 in the second embodiment, and is permitted to freely rotate about the hollow member 72. Thus, if the tire 38 adjacent to the roller member 92 is pressed against the system 32 of the second embodiment, the tire 38 will engage the roller member 92. Then, the roller member 92 will allow the tire 38 to continue rolling with less interference from the system 32. It is contemplated that the roller member 92 may have a predetermined amount of rotational friction to allow the roller member 92 to provide a slight braking action on the tire 38, when the tire 38 engages the roller member 92. It is also contemplated that the roller member 92 may have a controllable and/or variable amount of rotational friction to provide a more advanced braking of the tire 38, when the tire engages the roller member 92. In many embodiments and applications of the present invention, however, a roller member 92 may not be desired or may not be needed.

The shaft member 71 and the hollow member 72 of the first illustrative embodiment of FIGS. 5–7 each have a generally square cross-section shape. In the first illustrative embodiment, which was installed and used on the first test vehicle 22, the shaft member 71 has a cross-section of about 2 inches by 2 inches. If desired, an embodiment of the present invention may be easily modified and/or installed differently on a vehicle 22 to prevent the tires 38 from rubbing against the system 32. For example, the first embodiment may be installed parallel to the shock absorber 40 (see FIG. 5). As another example, the first embodiment may be made with a thinner shaft member 71 (e.g., 1 inch by 2 inches, rectangular shaped). It should also be noted that the shaft member 71 of an embodiment may have any suitable cross-section shape, including (but not limited to) the following shapes: circular, rounded, rounded corners, square, rectangular, triangular, pentagonal, hexagonal, octagonal, and arbitrarily shaped, for example. The size, proportions, and dimensions of the shaft member 71 may vary for other embodiment as well. Correspondingly, the inside portion of the hollow member 72 will preferably mate with the shaft member 71 to provide smooth sliding. However, the inside portion of the hollow member 72 may have a slightly different shape than the shaft member 71 (e.g., additional slot). The outside shape of the hollow member 72 will often be the same as, about the same as, or similar to the inside shape of the hollow member 72 (e.g., an extruded tubular member used to construct the hollow member 72). The outside shape of the hollow member 72 may have a different shape than the inside of the hollow member 72.

FIGS. 13–16 show various views of a third illustrative embodiment of the present invention. A 2005 Ford Explorer ("the second test vehicle") was tested with the third embodiment installed thereon. The third embodiment is similar to the first embodiment, except that the shaft member 71 is made thinner to provide clearance for the tires 38, and the system 32 is adapted to be mounted on a different vehicle 22 (i.e., the second test vehicle). The 2005 Ford Explorer has independent rear suspension with coil springs 42, rather than the leaf spring suspension with the solid rear transaxle of the first test vehicle. This illustrates that an embodiment of the present invention may be adapted to work with any vehicle and with any type of suspension system, including (but not limited to): solid axle, independent suspension systems, McPherson Struts suspension, double wishbone, trailing arm, three link, Packard arm, progressive rate springs, uniform rate springs, coil over shocks, torsion bar, and others, for example. The shaft member 71 of the third embodiment has a rectangular cross-section that has dimensions of about 1 inch by 2 inches. The system of the third embodiment provides enough clearance for the tires 38 so that the tires should never touch the system 32 during use.

Initial testing of the third embodiment on the second test vehicle 22 performing fish-hook maneuvers up to 40 mph (as described regarding FIGS. 1A–4 above) has revealed dramatic improvements in handling, stability, and controllability, as the first embodiment did on the first test vehicle. The second test vehicle 22 includes a roll stability control system, as a feature of the 2005 Ford Explorer (provided by Ford as OEM equipment). The Ford roll stability control system continuously determines if the vehicle may be approaching a situation where rollover is probable and applies braking to the wheels individually in an effort to prevent rollover. With the Ford system off and the system 32 of the third embodiment turned off, the second test vehicle is expected to perform better than the first test vehicle (with the system off) and is expected to have a higher rollover speed during a fish-hook maneuver, primarily due to the independent rear suspension. During initial testing with the Ford system on and the system 32 of the third embodiment turned off, the second test vehicle still exhibited the tendency to roll (extreme tilting of the vehicle body) and allowed the center of gravity 30 at the rear of the vehicle 22 to be raised significantly, and perhaps more than having the Ford system turned off. Using the Ford system in a fish-hook maneuver often caused the outside front tire to lock up and slide (constantly on some occasions and with a pulsing frequency on other occasions). This extreme braking on the outside front tire caused the second test vehicle to slow rapidly, but it also caused the vehicle to dive and transfer much of the body weight to the front outside tire. In some tests, the front outside tire was deflecting extremely due to the greater braking on that wheel by the Ford system and due to the weight shift. This shift of body weight to the right front tire caused a lifting of the rear portion of the vehicle. The use of the Ford system (without the use of the system 32 of the third embodiment) did reduce the turning radius and reduce the risk of rollover, but mostly because the vehicle was slowed significantly by the extreme braking applied automatically by the Ford system. Hence, the tests with the Ford system on were not under the same conditions of the prior fish-hook maneuver tests because the brakes were applied (as compared to the tests discussed regarding FIGS. 1A–4 and FIGS. 8A–11 where the brakes were not applied).

The second test vehicle was also tested with the Ford system on and off, and with the system of the third embodiment of the present invention turned on. In both cases, the system 32 of the third embodiment provided improvements to handling and controllability of the vehicle, provided a decreased turning radius 90, provided a lowering of the vehicle's center of gravity 30 (rather than raising), and significantly reduced the tilt of the vehicle body, as compared to not using the system 32 of third embodiment (with or without the use of the Ford system). The combination of the computer-controlled braking of the Ford system and the control of the expansion of the rear springs 42 with the system 32 of the third embodiment provided the best test results. Thus again, an embodiment of the present invention still improves the handling and stability of the vehicle during a fish-hook maneuver test, even when the vehicle is equipped with an advanced braking control system.

Figure 14:
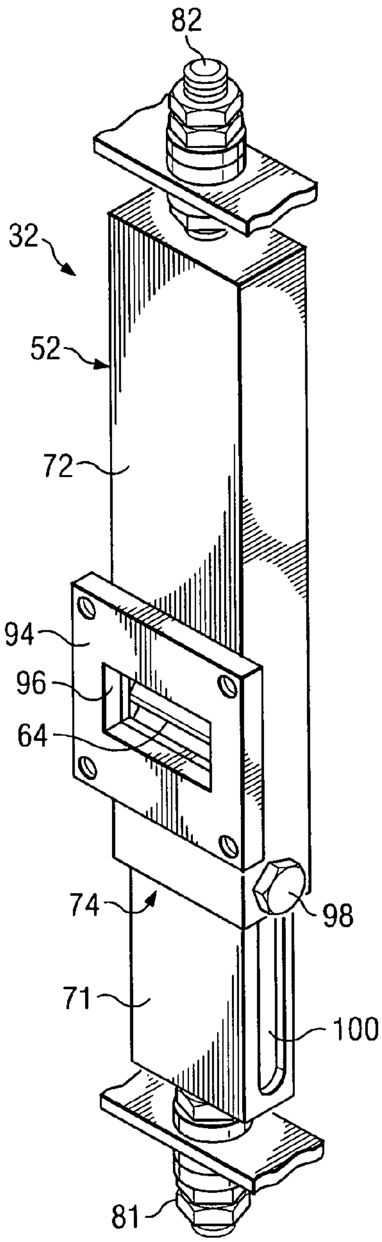
Figure 15:
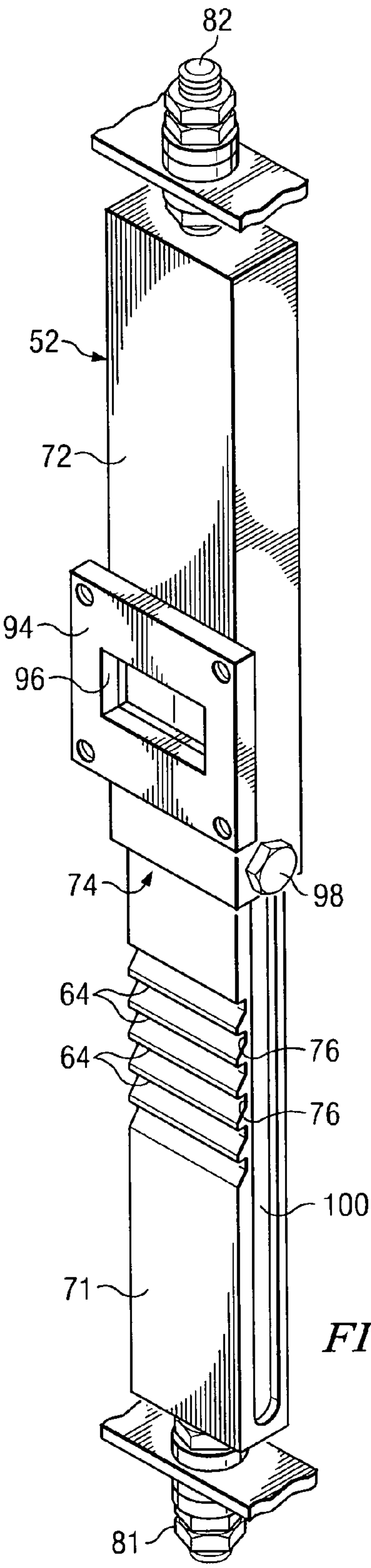
Figure 16:
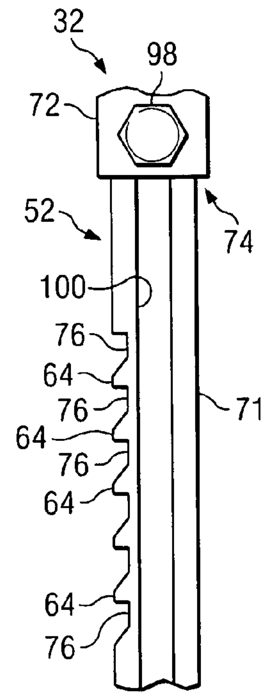

FIGS. 14 and 15 show perspective views of the ratchet mechanism 52 for the third illustrative embodiment. FIG. 16 is an enlarged side view showing a portion of the ratchet mechanism 52 of the third embodiment. The movable tongue system 46 is not shown in FIGS. 14 and 15, which reveal a mounting plate 94 welded to the hollow member 72. This mounting plate 94 may be used to firmly attach the movable tongue system 46 to the ratchet mechanism 52. A slot 96 is formed through the mounting plate 94 and is aligned with the side hole 88 formed through a sidewall of the hollow member 72. This slot 96 allows the movable tongue member 54 of the third embodiment to extend into the hollow member 72 and engage the teeth 64 on the shaft member 71 (i.e., at the second tongue position 62). In FIG. 14, the ratchet mechanism 52 is shown at a normal ride height for the second test vehicle 22. In FIGS. 15 and 16, the ratchet mechanism 52 is shown fully extended, such extension being limited by a stop pin 98. For the third embodiment, the shaft member 71 has a slot or groove 100 formed along a side of the shaft member 71, as shown in FIG. 16. The stop pin 98 extends through a side wall of the hollow member 72 and slides within the groove 100 as the shaft member 71 moves in and out of the hollow member 72. In the third embodiment, the stop pin 98 is a bolt with a rounded end. The groove 100 terminates before the end of the shaft member 71 and the pin 98 restricts the shaft member 71 from being pulled completely out of the hollow member 72. Hence, when a vehicle 22 is jacked up (e.g., when changing a tire or replacing brake pads) and the suspension is permitted to expand, the shaft member 71 will not be permitted to completely exit the hollow member 72.

As is also shown in FIGS. 14 and 15, the teeth 64 are formed along the shaft member 71 to correspond with an expected range of travel for the vehicle suspension during an extreme turning maneuver. Hence, the number of teeth 64 and the placement of the teeth 64 along the shaft member 71 may vary for different embodiments of the present invention.

Figure 17:
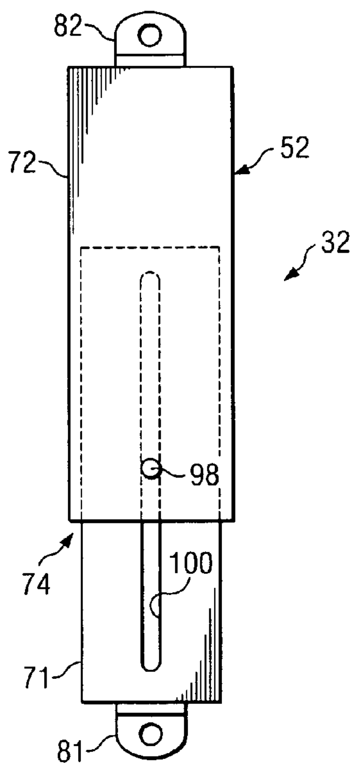
FIGS. 17 and 18 are simplified views of ratchet mechanisms to show two illustrative ways to prevent the shaft member from being pulled completely out of the hollow member.
Figure 18:
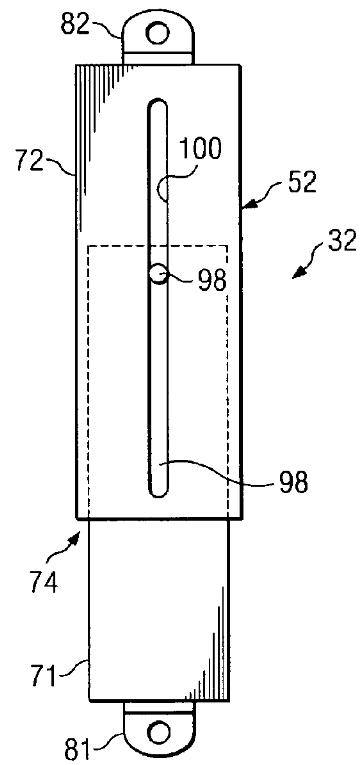

FIGS. 17 and 18 are simplified views of ratchet mechanisms 52 (teeth and movable tongue system not shown) to show two illustrative ways (among many others) to prevent the shaft member 71 from being pulled completely out of the hollow member 72. The configuration shown in FIG. 17 is essentially the same as that of the third embodiment (FIGS. 14–16), in that a stop pin 98 is fixed to the hollow member 72 and the groove 100 is formed in the shaft member 71. FIG. 18 shows an opposite configuration. In FIG. 18, a slot 100 is formed in, partially through or through, a sidewall of the hollow member 72 and a stop pin 98 extends from the shaft member 71 and into (or through) the slot 100. Thus, in FIG. 18, the pin 98 moves with the shaft member 71 and the slot 100 remains fixed relative to the hollow member 72. As will be apparent to one of ordinary skill in the art, there are many other ways (not shown) to prevent the shaft member 71 from being completely removed from the hollow member 72. Although preferred for most applications, an embodiment of the present invention may not include a way to prevent the shaft member 71 from being completely removed from the hollow member 72.

Figure 19A:
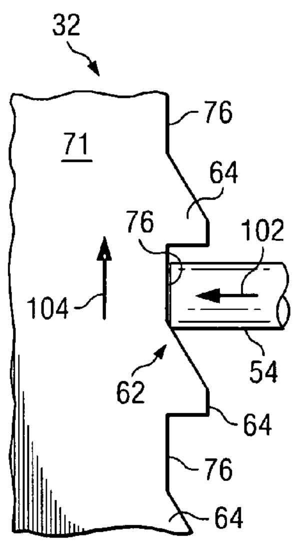
FIGS. 19A–19D show enlarged views of the teeth on the shaft member moving relative to the tongue member for the first embodiment (corresponding to FIG. 7) during a use of the system.
Figure 19B:
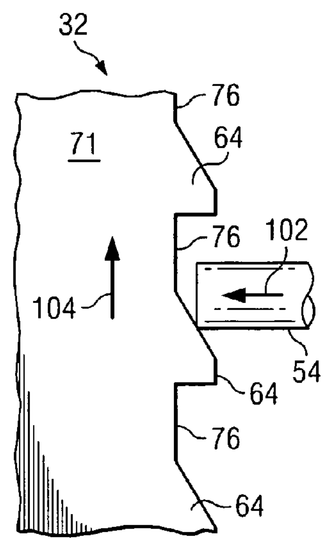
Figure 19C:
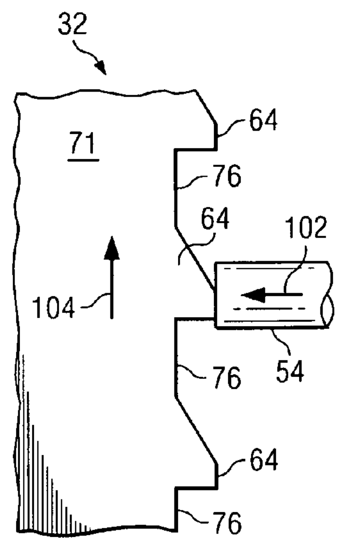
Figure 19D:
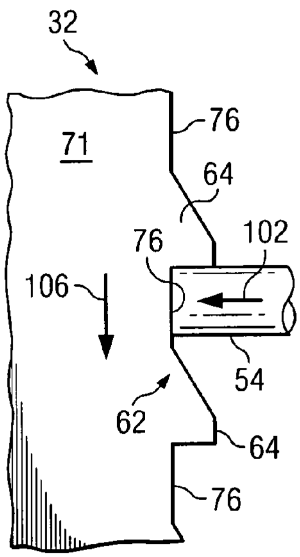
Figure 20A:
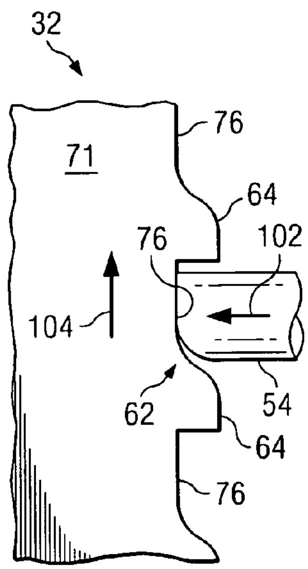
FIGS. 20A–20D illustrate a set of teeth and a tongue member of a fourth illustrative embodiment of the present invention.
Figure 20B:
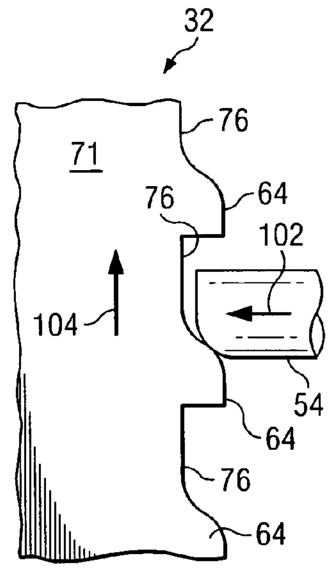
Figure 20C:
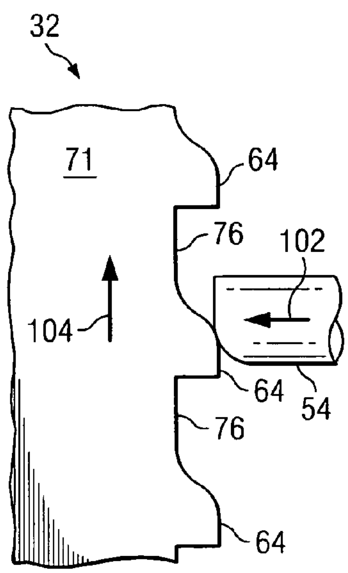
Figure 20D:
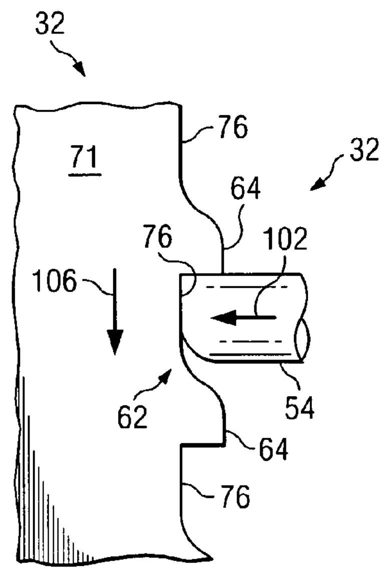
Figure 21A:
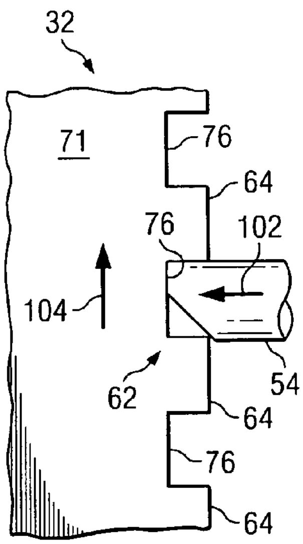
FIGS. 21A–21D illustrate a set of teeth and a tongue member of a fifth illustrative embodiment of the present invention.
Figure 21B:
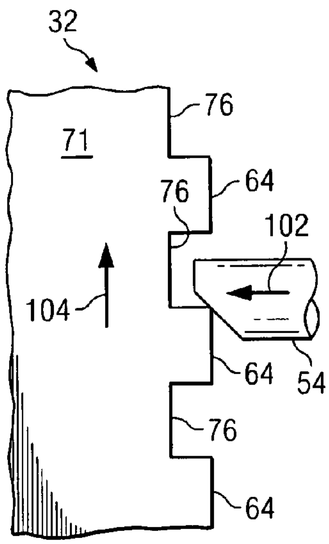
Figure 21C:
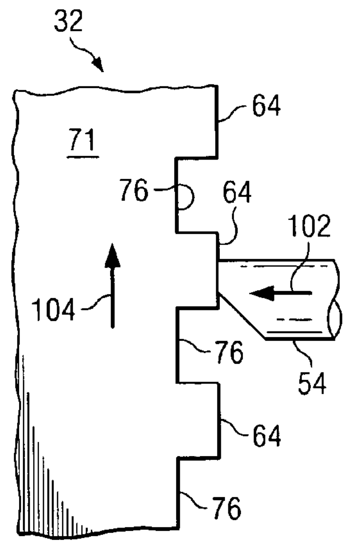
Figure 21D:
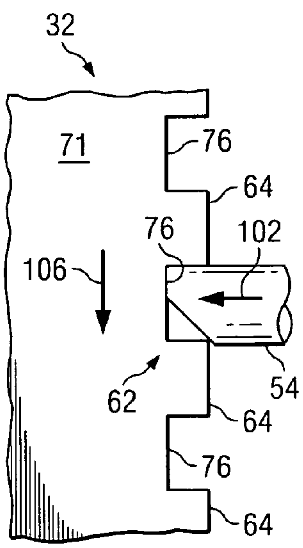
Figure 22A:
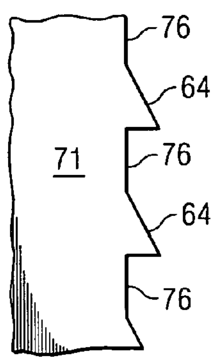
FIGS. 22A–22E show some illustrative examples for teeth patterns that may be implemented in an embodiment of the present invention.
Figure 22B:
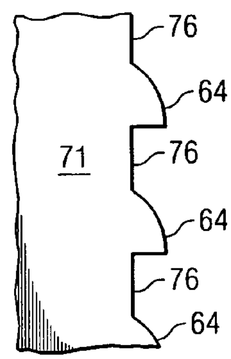
Figure 22C:
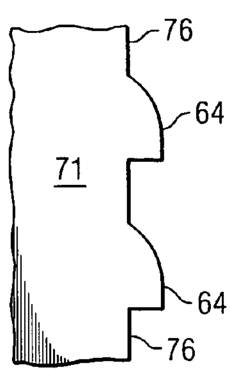
Figure 22D:
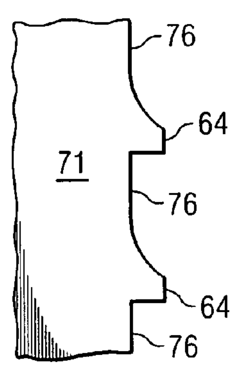
Figure 22E:
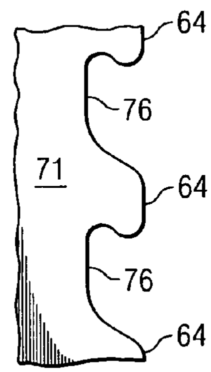
Figure 23A:
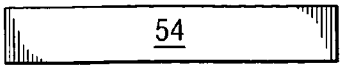
FIGS. 23A–23E show some illustrative examples for cross-sections of tongue members that may be implemented in an embodiment of the present invention.
Figure 23B:
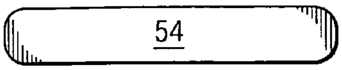
Figure 23C:
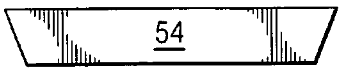
Figure 23D:
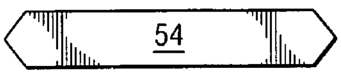
Figure 23E:
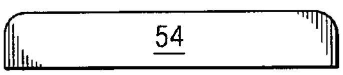

FIGS. 19A–19D show enlarged views of the teeth 64 on the shaft member 71 moving relative to the tongue member 54 for the first embodiment (corresponding to FIG. 7) during a use of the system 32. In FIG. 19A, the tongue member 54 is being driven toward the second tongue position 62 (as indicated by arrow 102) and is engaging the teeth 64 on the shaft member 71. Also in FIG. 19A, the shaft member 71 is being moved upward (as indicated by the arrow 104) as the ratchet mechanism 52 is being compressed by the unsprung mass portion of the vehicle 22 moving toward the sprung mass portion of the vehicle 22 (e.g., when the suspension on that side being compressed by the body roll or tilt during a turn). FIGS. 19B and 19C show the motion of FIG. 19A continued. As the beveled side of a tooth 64 meets the tongue member 54, the tongue member 54 is pushed back toward the first tongue position 61, even though the solenoid 48 is still exerting a force on the tongue member 54 to drive the tongue member 54 toward the second tongue position 62 (as indicated by arrow 102). Hence, the upward force exerted on the shaft member 71 by the vehicle suspension being compressed is sufficient to overcome the force of the solenoid 48. The solenoid 48 should be sized appropriately for the system 32 to permit this motion to happen during use of the system 32. Preferably the solenoid 48 is sized so that the force of the solenoid 48 is sufficient to hold the tongue member 54 in the second tongue position 62 when needed (e.g., when the shaft member 71 moves the flat side of a tooth 64 toward the tongue member 54) but not so strong that the tongue member 54 is bent or the teeth 64 are damaged when the shaft member 71 moves the beveled side of a tooth 64 toward the tongue member 54 (as in FIGS. 19A–19C). When the system 32 is activated (as in FIGS. 7 and 19A–19D) and the spring of the suspension tries to expand the suspension (push up on the vehicle body) (as indicated by arrow 106 in FIG. 19D), the flat side of a tooth 64 engages with the tongue member 54, as shown in FIG. 19D. This prevents further sliding of the shaft member 71 in that direction 106, and thus prevents the suspension from expanding. Hence, FIGS. 19A–19D have illustrated the ratcheting effect provided by the ratchet mechanism 52 and the movable tongue system 46 for the first embodiment of FIGS. 5–7.

In the first, second, and third embodiments discussed above, one particular combination of a tongue member configuration and a tooth configuration is shown, i.e., a rectangular-tipped tongue member 54 and teeth 64 beveled on one side (see e.g., FIGS. 6, 7, and 19A–19D). However, there are many possible teeth configurations and many possible tongue member configurations that may be used in an embodiment of the present invention. Next, some illustrative examples (among many others not shown) of different teeth configurations and different tongue member configurations will be discussed with reference to FIGS. 20A–25.

FIGS. 20A–20D illustrate a set of teeth 64 and a tongue member 54 of a fourth illustrative embodiment of the present invention. In FIGS. 20A–20D, the teeth 64 have a curved side and a flat side, and the tongue member 54 has a curved side and a flat side. FIGS. 20A–20D illustrate for the fourth embodiment the same motion of the shaft member 71 relative to the tongue member 54 that was illustrated for the first embodiment in FIGS. 19A–19D. Hence, the teeth 64 and tongue member 54 of FIGS. 20A–20D provide another way to provide the ratchet effect for a ratchet mechanism 52 of an embodiment.

FIGS. 21A–21D illustrate a set of teeth 64 and a tongue member 54 of a fifth illustrative embodiment of the present invention. In FIGS. 21A–21D, the teeth 64 have flat sides, and the tongue member 54 has a beveled side and a flat side. FIGS. 21A–21D illustrate for the fifth embodiment the same motion of the shaft member 71 relative to the tongue member 54 that was illustrated for the first embodiment in FIGS. 19A–19D. Hence, the teeth 64 and tongue member 54 of FIGS. 21A–21D show yet another way to provide the ratchet effect for a ratchet mechanism 52 of an embodiment. Also, the fifth embodiment illustrates that the teeth 64 may have a square or non-beveled pattern, while still providing a ratcheting effect via the tongue member 54.

FIGS. 22A–22E show some illustrative examples (among many others not shown) for teeth patterns that may be implemented in an embodiment of the present invention. These teeth 64 shown in FIGS. 22A–22E are shown formed on shaft members 71, but may be formed on other components or portions of an embodiment. It should be noted that although each tooth 64 of each corresponding set of teeth 64 is the same for the illustrative embodiments shown and described herein thus far, the teeth 64 in a given set of teeth for an embodiment may not all be the same and may not all be uniformed spaced and/or uniformly distributed relative to each other. For example, the spacing between teeth 64 of a given set of teeth may vary at different locations along the shaft member 71. As another example (not shown), teeth 64 at the ends of a given set of teeth may differ from other teeth in the set. Also, a set of teeth 64 for an embodiment may have any number of teeth (e.g., 1, 2, 3, 4, 10, 14, 31, etc.).

FIGS. 23A–23E show some illustrative examples (among many others not shown) for cross-sections of tongue members 54 that may be implemented in an embodiment of the present invention. Hence, the tongue member 54 of an embodiment may have any suitable or desirable shape. The cross-section of the tongue member 54 may be uniform along the extent of the tongue member 54, or it may vary and differ at different locations along the extent of the tongue member 54.

Figure 24A:
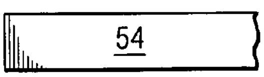
FIGS. 24A–24Q show some illustrative examples for end profiles of tongue members that may be implemented in an embodiment of the present invention.
Figure 24B:
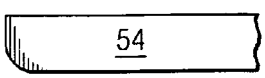
Figure 24C:
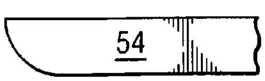
Figure 24D:
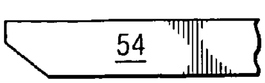
Figure 24E:
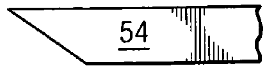
Figure 24F:
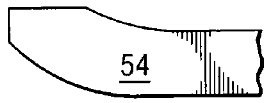
Figure 24G:
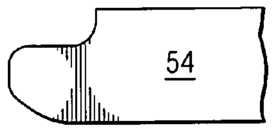
Figure 24H:
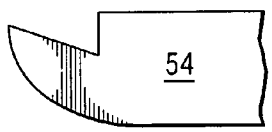
Figure 24I:
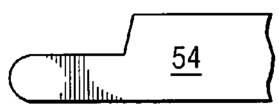
Figure 24J:
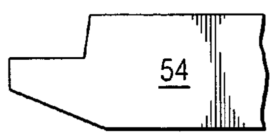
Figure 24K:
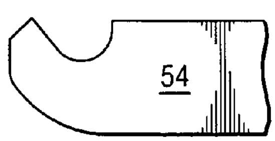
Figure 24L:
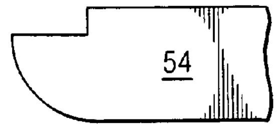
Figure 24M:
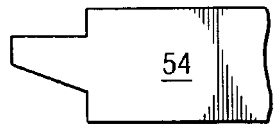
Figure 24N:
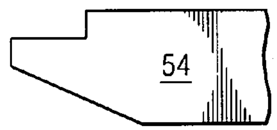
Figure 24O:
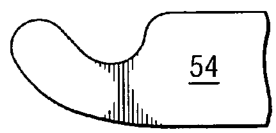
Figure 24P:
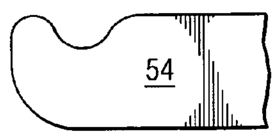
Figure 24Q:
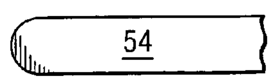

FIGS. 24A–24Q are side views showing ends of tongue members 54 (i.e., the end that engages the teeth 64 of a ratchet mechanism 52). FIGS. 24A–24Q show some illustrative examples (among many others not shown) for end profiles of tongue members 54 that may be implemented in an embodiment of the present invention. Hence, the end profile of a tongue member 54 for an embodiment may have any suitable or desirable shape. Typically, the end profile shape will correspond to or be adapted to at least partially mate with a recess profile between teeth 64 and/or any other portion of one or more teeth 64.

Figure 25:
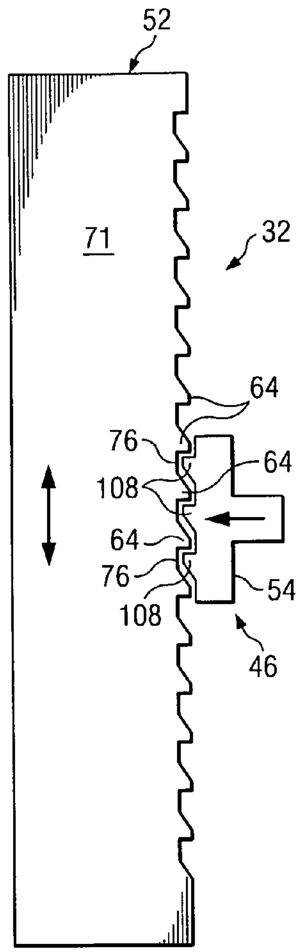
FIG. 25 illustrates a set of teeth and a tongue member of a sixth illustrative embodiment of the present invention.

FIG. 25 illustrates a set of teeth 64 and a tongue member 54 of a sixth illustrative embodiment of the present invention. Only part of the system 32 of the sixth embodiment is shown, for purposes of simplifying the drawing. In FIG. 25, the tongue member 54 is larger and has multiple teeth 108, rather than just one "tooth" (i.e., the end of the tongue member 54). FIG. 25 illustrates that the tongue member 54 may be larger and that the tongue member 54 may have one or more teeth 108 formed therein or formed thereon. It is further contemplated that in an embodiment (not shown) of the present invention the tongue member 54 may have a series of teeth 108 (as in FIG. 25, or more) and the shaft member 71 may have only one tooth 64 or pin or tongue extending therefrom adapted to engage with the teeth 108 on the tongue member 54 to provide a ratcheting effect when engaged.

Figure 26:
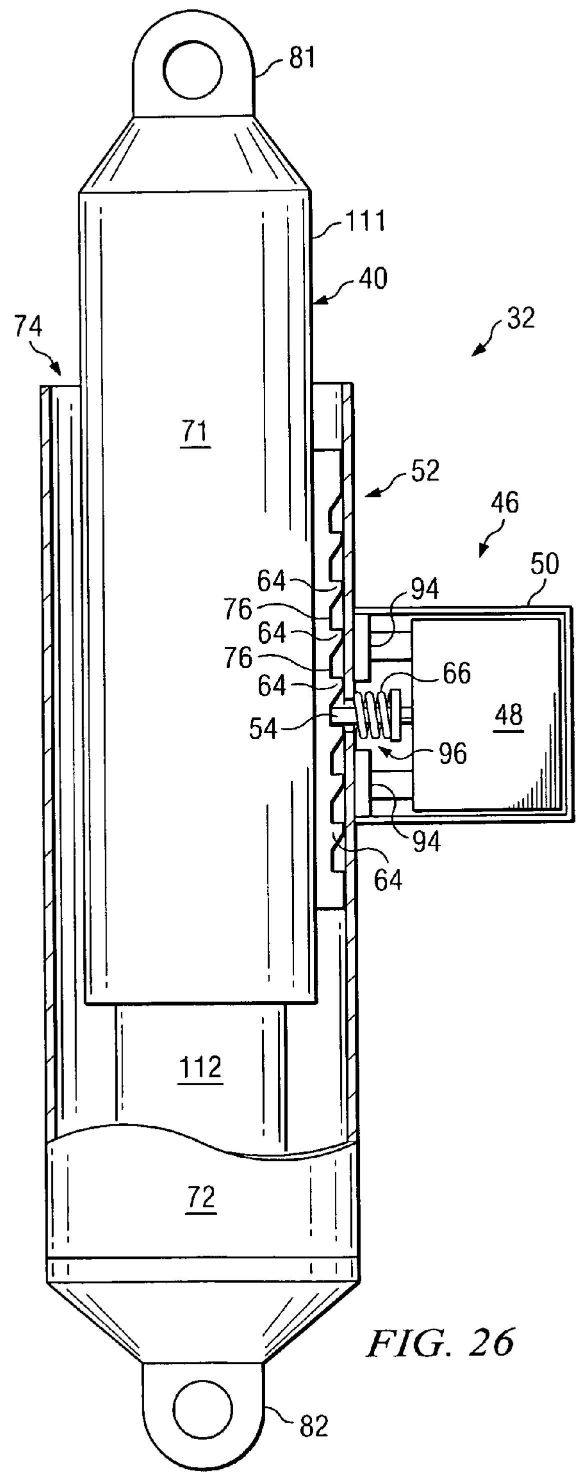
FIG. 26 is a side view showing part of a seventh embodiment of the present invention.

FIG. 26 is a side view showing part of a seventh embodiment of the present invention. In the seventh embodiment, the ratchet mechanism 52 is integrated with a shock absorber 40 (dampener). Thus, instead of having the ratchet mechanism 52 mounted separately from the shock absorber 40 (as in the first in embodiment shown in FIG. 5), a shock absorber 40 may be replaced by a ratchet mechanism 52 of the seventh embodiment. When the system 32 is on but not activated (i.e., solenoid 48 is not driving tongue member 54 toward second tongue position 62) for the seventh embodiment, the ratchet mechanism 52 merely acts as a shock absorber. The shock absorber 40 acts as a shaft member 71. A set of teeth 64 may be attached to or integrally formed on a first portion 111 of the shock absorber 40, as shown in FIG. 26 for example. A second portion 112 of the shock absorber 40 is slidably coupled to the first portion 111 of the shock absorber 40. The second portion 112 of the shock absorber 40 is attached to or is an integral part of the hollow member 72. In FIG. 26, a sidewall portion of the hollow member 72 is broken away to illustrate the portions of the system 32 otherwise hidden by the hollow member 72. Also, a cover 50 of the movable tongue system 46 is broken away in FIG. 26 to show portions of the movable tongue system 46 that would be otherwise hidden. One of the advantages of the seventh embodiment is that it may save space by combining the shock absorber 40 with the ratchet mechanism 52 of the system 32. Another advantage of the seventh embodiment is that the system 32 may be installed quickly and easily on a vehicle 22 by simply replacing an existing shock absorber 40 with the ratchet mechanism 52 of the system 32, rather than having to install separate brackets for the mounting the ratchet mechanism 52.

Although the embodiments described thus far have slider mechanisms with teeth 64 extending along a straight line, the ratchet mechanism 52 may be configured differently for other embodiments. FIGS. 27–29 and 39 show some illustrative embodiments (among many others not shown) that have different types of ratchet mechanisms 52, and different installation positions in relation to the suspension system of the vehicle 22.

Figure 27:
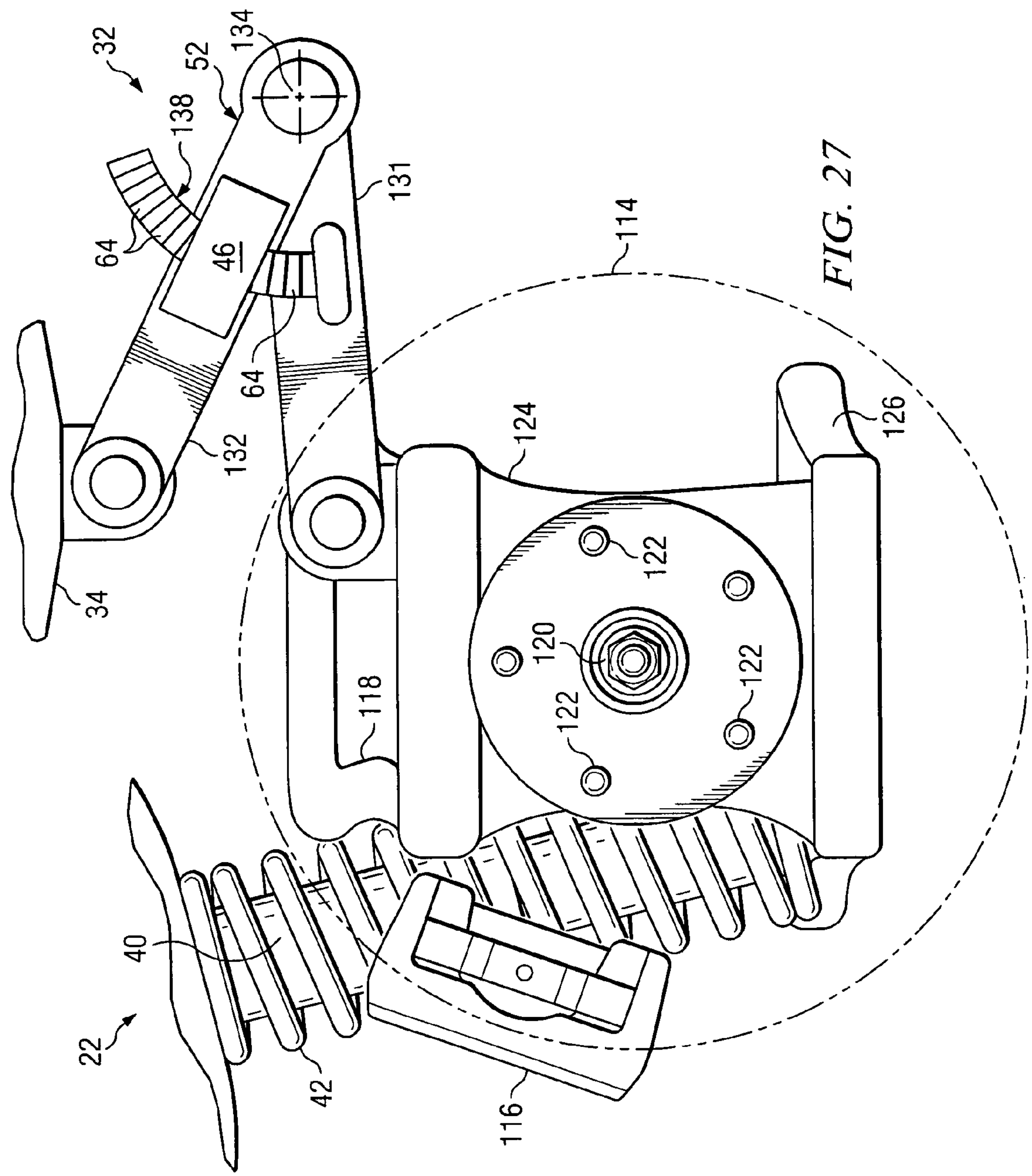
FIG. 27 shows a system of an eighth embodiment of the present invention operably installed on a vehicle.

FIG. 27 shows a system 32 of an eighth embodiment of the present invention operably installed on a vehicle 22. In FIG. 27, a rear independent suspension system for one side of the vehicle 22 is shown. The wheel and tire are removed in FIG. 27. Also, an outline for the brake disc 114 of the disc brake system is shown in dashed line and the brake disc 114 is shown transparently to illustrate the components located behind the brake disc 114. The brake caliper 116 is shown. The suspension system has a coil spring 42, a shock absorber 40, an upper control arm 118, a wheel axle 120 (with wheel studs 122 extending therefrom), an upright member 124, and a lower control arm 126, as shown in FIG. 27. In the eighth embodiment shown in FIG. 27, the ratchet mechanism 52 of the vehicle stability control system 32 is attached between a sprung mass portion (e.g., frame or body) of the vehicle 22 and the upper control arm 118 of the suspension (which is part of the unsprung portion of the vehicle 22). In other variations of the eighth embodiment, the ratchet mechanism 52 may be attached to other portions of the suspension, including (but not necessarily limited to): a lower control arm 126, an upright member 118, or a bracket extending from a movable part of the suspension system.

The ratchet mechanism 52 of FIG. 27 includes two arms 131, 132 that are pivotably coupled together at a first pivot point 134. Hence, the first arm 131 can pivot at the first pivot point 134 relative to the second arm 132. The first arm 131 is pivotably coupled to the upper control arm 118. The second arm 132 is pivotably coupled to a sprung mass portion (e.g., frame or body) of the vehicle 22. A tooth arm 138 is attached to (or may be an integral part of) the first arm 131, and the tooth arm 138 extends from the first arm 131 and across the second arm 132, as shown in FIG. 27. The tooth arm 138 extends across at least part of a movable tongue system 46. The movable tongue system 46 of the eighth embodiment is attached to the second arm 132. As shown in FIG. 27, the tooth arm 138 may extend through the movable tongue system 46. The tooth arm 138 has a set of ratchet teeth 64 attached thereto or formed thereon. The movable tongue system 46 of the eighth embodiment includes a solenoid 48 and a tongue member 54, similar to that of the first embodiment. The solenoid 48 drives the tongue member 54 into engagement with the ratchet teeth 64 on the tooth arm 138 to provide a ratchet effect for the ratchet mechanism 52 when the system 32 is activated. When the system 32 of the eighth embodiment is activated, the vehicle wheel is permitted to move toward the vehicle body (compressing the coil spring 42), but the wheel is prevented from moving away from the vehicle body (preventing the coil spring 42 from pushing the vehicle body upward). When the system 32 of the eighth embodiment is not activated, the tooth arm 138 is free to move in both directions relative to the second arm 132.

Figure 28:
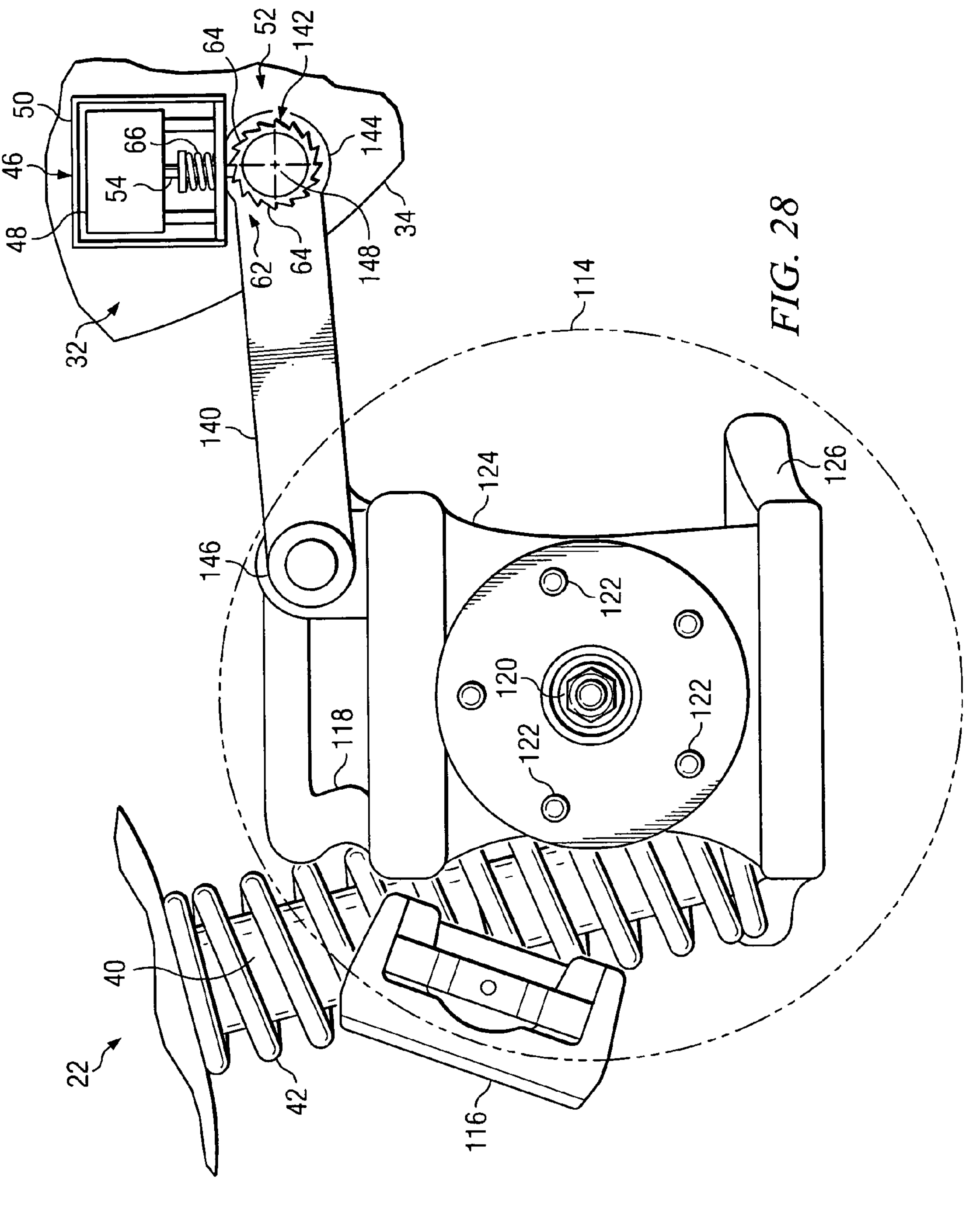
FIG. 28 shows a system of a ninth embodiment of the present invention operably installed on a vehicle.

FIG. 28 shows a system 32 of a ninth embodiment of the present invention operably installed on a vehicle 22. As in FIG. 27, FIG. 28 shows a rear independent suspension system for one side of the vehicle 22. The wheel and tire are removed in FIG. 28. Also, an outline for the brake disc 114 of the disc brake system is shown in dashed line and the brake disc 114 is shown transparently to illustrate the components located behind the brake disc 114. The brake caliper 116 is shown. The suspension system has a coil spring 42, a shock absorber 40, an upper control arm 118, a wheel axle 120 (with wheel studs 122 extending therefrom), an upright member 124, and a lower control arm 126, as shown in FIG. 28. In the ninth embodiment shown in FIG. 28, the ratchet mechanism 52 of the vehicle stability control system 32 is attached between a sprung mass portion (e.g., frame or body) of the vehicle 22 and the upper control arm 118 of the suspension (which is part of the unsprung portion of the vehicle 22). In other variations of the ninth embodiment, the ratchet mechanism 52 may be attached to other portions of the suspension, including (but not necessarily limited to): a lower control arm 126, an upright member 124, or a bracket extending from a movable part of the suspension system.

The ratchet mechanism 52 of FIG. 28 includes a suspension arm 140 and a ratchet gear 142. A first end 144 of the arm 140 is pivotably coupled to a sprung mass portion (e.g., frame or body) of the vehicle 22. A second end 146 of the arm 140 is pivotably coupled to the upper control arm 118 of the suspension. The ratchet gear 142 extends from the arm 140 about a pivot axis 148 of the first end 144. In the ninth embodiment, the ratchet gear 142 extends circumferentially completely around the pivot axis 148. In other embodiments (not shown), however, the ratchet gear 142 may only extend (circumferentially) partially around the pivot axis 148. In the ninth embodiment, the ratchet gear 142 is fixed relative to the arm 140 and pivots with the arm 140. The ratchet gear 142 has a series of ratchet teeth 64. The teeth 64 of a ratchet gear 142 may have any suitable shape, but preferably corresponds to a shape chosen for the movable tongue member 54. The movable tongue system 46 of the ninth embodiment may be similar to that of the first embodiment (described above), for example. The movable tongue system 46 of the ninth embodiment is fixed relative to the sprung mass portion. When the system 32 of the ninth embodiment is activated, the vehicle wheel is permitted to move toward the vehicle body (compressing the coil spring), but the wheel is prevented from moving away from the vehicle body (preventing the coil spring 42 from pushing the vehicle body upward). When the system 32 of the ninth embodiment is not activated, the ratchet gear 142 is free to pivot in both rotational directions relative to the tongue member 54 and the tongue member 54 does not engage the teeth 64.

Figure 29:
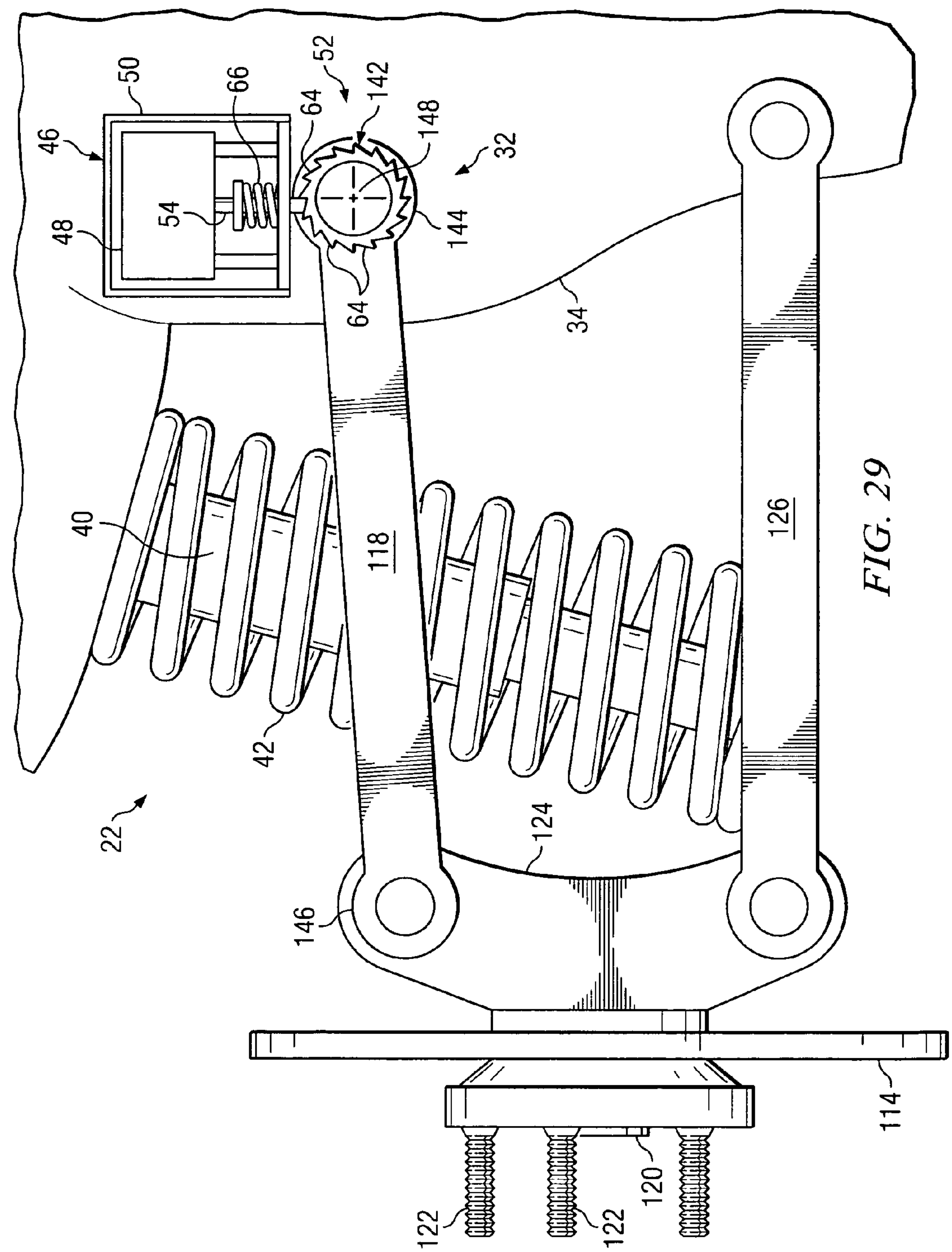
FIG. 29 shows a system of a tenth embodiment of the present invention operably installed on a vehicle.

FIG. 29 shows a system of a tenth embodiment of the present invention operably installed on a vehicle. As in FIGS. 27 and 28, FIG. 29 shows a rear independent suspension system for one side of the vehicle, except that FIG. 29 shows a different view of the suspension. The wheel and tire are removed in FIG. 29. The brake system shown in FIG. 29 includes a brake caliper (not shown) and a brake disc 114. The suspension system has a coil spring 42, a shock absorber 40, an upper control arm 118, a wheel axle 120 (with wheel studs 122 extending therefrom), an upright member 124, and a lower control arm 126, as shown in FIG. 29. In the tenth embodiment shown in FIG. 29, the ratchet mechanism 52 of the vehicle stability control system 32 is attached between a sprung mass portion (e.g., frame or body) of the vehicle 22 and the upper control arm 118 of the suspension (which is part of the unsprung portion of the vehicle). Also, the ratchet mechanism 52 of the tenth embodiment is an integral part of the suspension system. The upper control arm 118 of the suspension system is part of the ratchet mechanism 52 in the tenth embodiment, as shown in FIG. 29. In other variations (not shown) of the tenth embodiment, the lower control arm 126 or some other suspension component that pivotably connects between the sprung mass portion and the unsprung mass portion (e.g., Packard arm, trailing arm, anti-sway bar) may be part of the ratchet mechanism 52. Furthermore, any suspension component that pivots when the sprung mass portion moves toward and away from the unsprung mass portion of the vehicle 22 may be part of the ratchet mechanism 52 in other embodiments, so long as the restriction of pivoting of the suspension component relative to another component (sprung or unsprung) will also restrict the spring 42 of the suspension from expanding via the ratchet mechanism 52 formed there.

The ratchet mechanism 52 of FIG. 29 includes a suspension arm (upper control arm 118) and a ratchet gear 142. A first end 144 of the arm 118 is pivotably coupled to a sprung mass portion (e.g., frame or body) of the vehicle 22. A second end 146 of the arm 118 is pivotably coupled to the upright member 124 of the suspension. The ratchet gear 142 extends from the suspension arm 118 about a pivot axis 148 of the first end. In the tenth embodiment, the ratchet gear 142 extends circumferentially completely around the pivot axis 148. In other embodiments (not shown), however, the ratchet gear 142 may only extend (circumferentially) partially around the pivot axis 148. In the tenth embodiment, the ratchet gear 142 is fixed relative to the suspension arm 118 and pivots with the arm 118. The ratchet gear 142 has a series of ratchet teeth 64. The teeth 64 of a ratchet gear 142 may have any suitable shape, but preferably corresponds to a shape chosen for the movable tongue member 54. The movable tongue system 46 of the tenth embodiment may be similar to that of the first embodiment (described above), for example. The movable tongue system 46 of the ninth embodiment is fixed relative to the sprung mass portion. When the system 32 of the tenth embodiment is activated, the vehicle wheel (not shown) is permitted to move toward the vehicle body (compressing the coil spring 42), but the wheel is prevented from moving away from the vehicle body (preventing the coil spring 42 from pushing the vehicle body upward). When the system 32 of the tenth embodiment is not activated, the ratchet gear 142 is free to pivot in both rotational directions relative to the tongue member 54 and the tongue member 54 does not engage the teeth 64.

Figure 30:
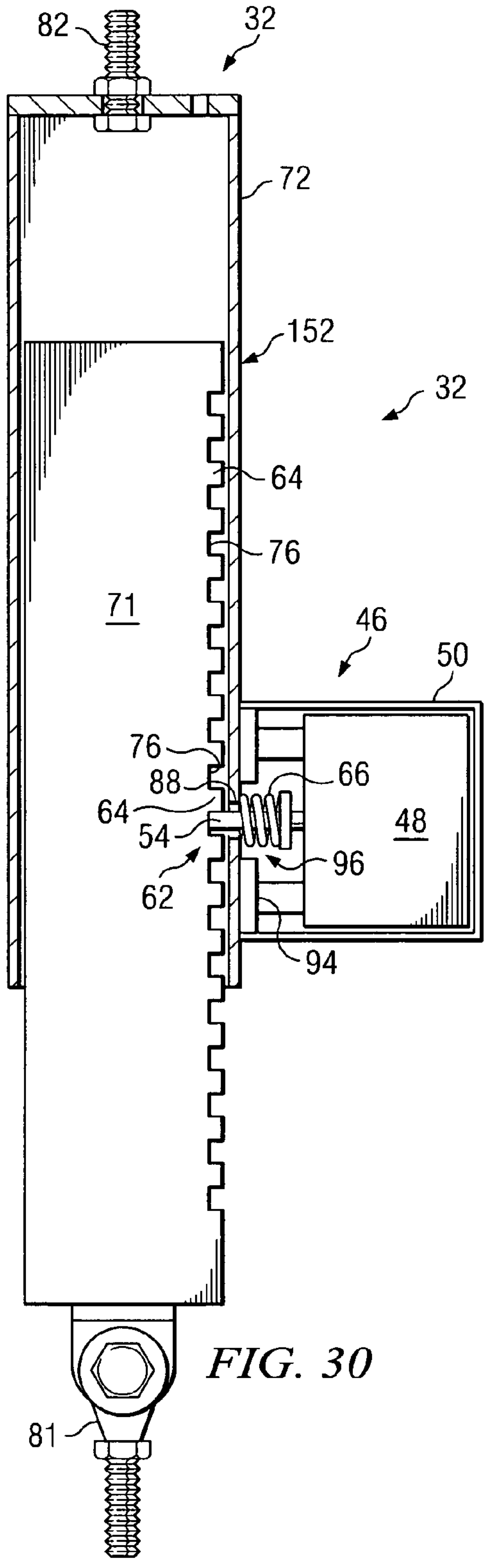
FIG. 30 is a side view of a slider mechanism and movable tongue system of an eleventh embodiment of the present invention.

FIG. 30 is a side view of a slider mechanism 152 and movable tongue system 46 of an eleventh embodiment of the present invention. The eleventh embodiment is the same as the first embodiment (see e.g., FIGS. 6 and 7), except that the teeth 64 on the shaft member 71 are different. However, due to the different shape of the teeth 64 (in combination with the chosen shape of the tongue member 54), the slider mechanism 152 of the eleventh embodiment is not a ratchet mechanism. The eleventh embodiment merely locks the position of the suspension when activated, rather than allowing further compression of the suspension (as the first embodiment allows). The first embodiment of FIGS. 5–7 has been found to perform better than the eleventh embodiment during testing on the first test vehicle 22 performing fish-hook maneuvers. Thus, the first embodiment and other embodiments that provide a ratchet mechanism 52 (rather than fully locking the position of the suspension) may be more preferred for most applications.

Figure 31:
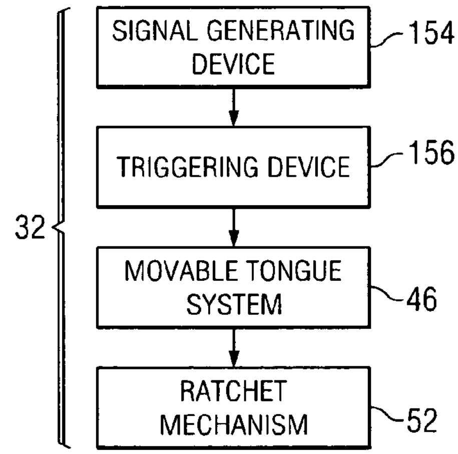
FIGS. 31–34 show simplified schematics for components of various embodiments.

As mentioned above, a preferred embodiment of the present invention preferably includes a signal generating device 154, a triggering device 156, a movable tongue system 46, and a ratchet mechanism 52. This is illustrated generally and schematically at a high level by FIG. 31. Much detail has been provided above regarding some illustrative examples of some possible variations for the ratchet mechanism 52 and the tongue member 54. Next, illustrative examples of some possible variations for the signal generating device 154, triggering device 156, and movable tongue system 46 will be discussed. For each device there also may be variations among the components and combination of possible components that make up the device.

Figure 32A:
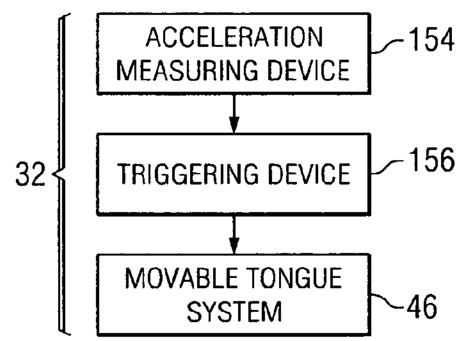
Figure 32B:
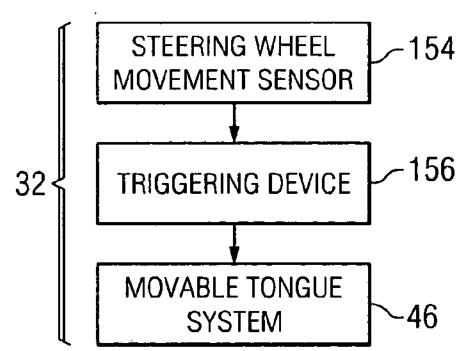
Figure 32C:
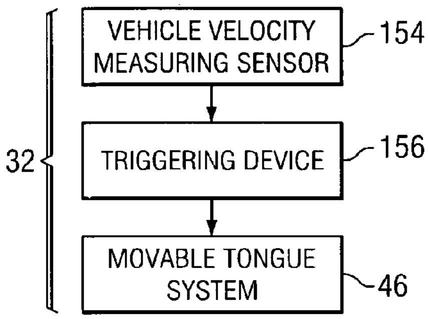
Figure 32D:
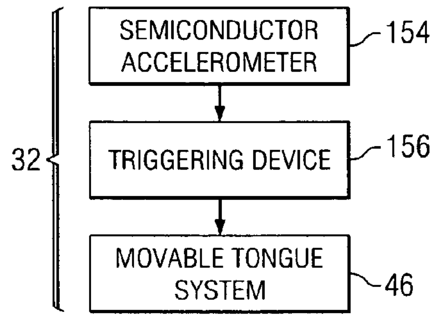
Figure 33A:
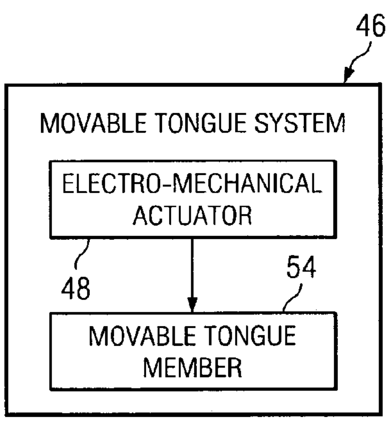
Figure 33B:
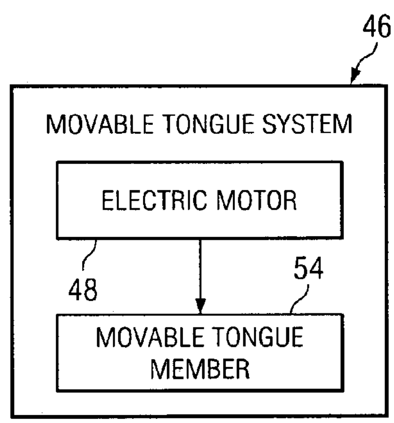
Figure 33C:
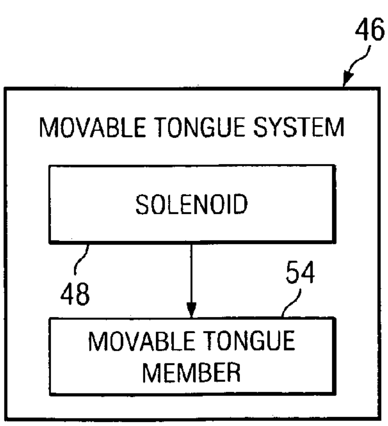
Figure 33D:
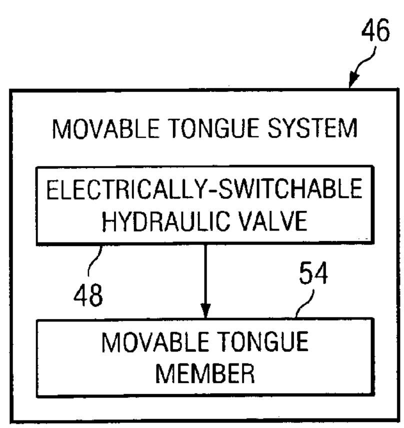
Figure 33E:
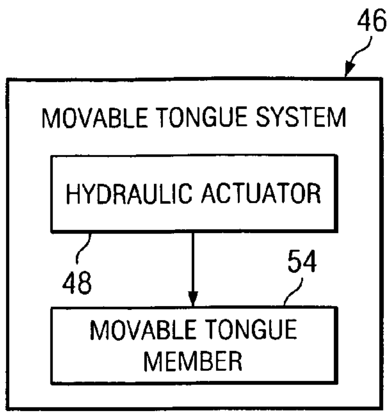
Figure 33F:
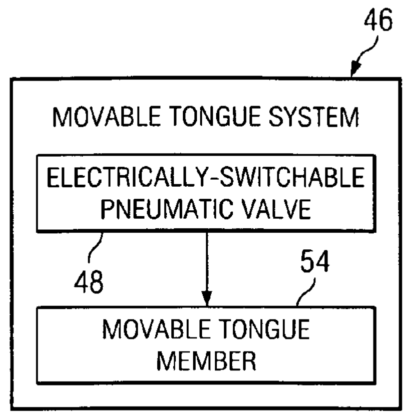
Figure 33G:
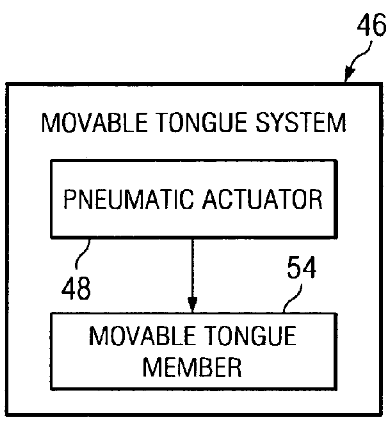
Figure 33H:
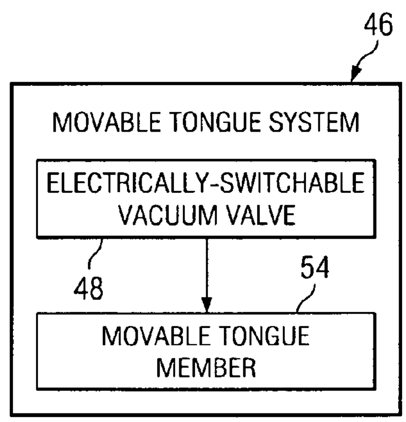
Figure 33I:
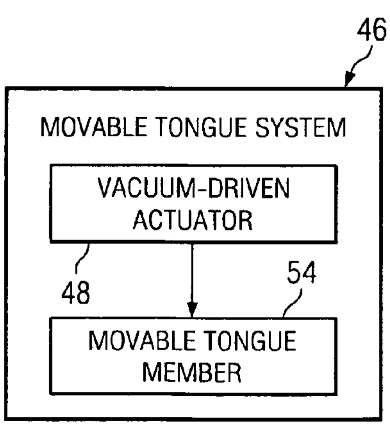
Figure 33J:
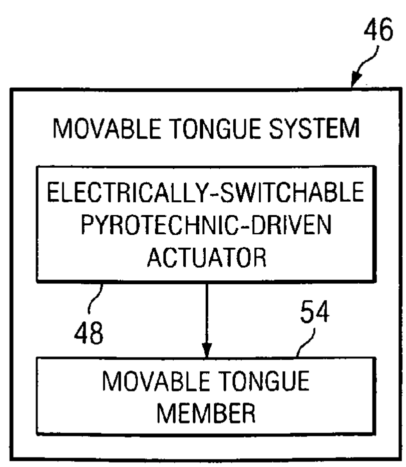
Figure 33K:
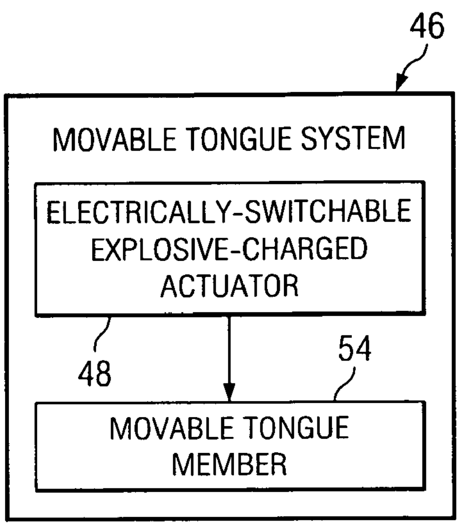
Figure 33L:
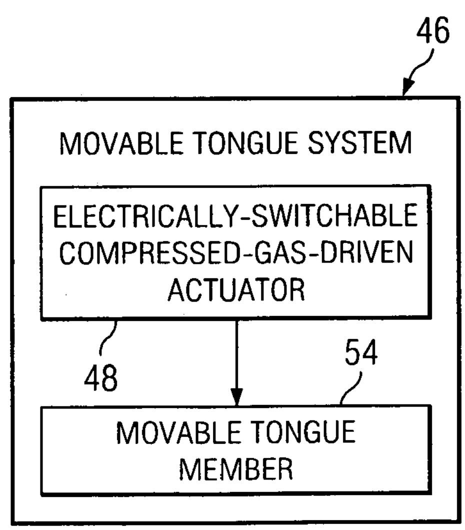

Referring again to the first embodiment of FIGS. 5–7, the signal generating device 154, triggering device 156, and movable tongue system 46 of the first embodiment will be described with reference to FIGS. 32–35. As mentioned above, the signal generating device 154 of the first embodiment is an acceleration measuring device. FIG. 32A is a simplified schematic illustrating the connection andlor communication between the acceleration measuring device 154, the triggering device 156, and the movable tongue system 46. FIG. 32B is a modification of FIG. 32A where the acceleration measuring device 154 includes a steering wheel movement sensor. FIG. 32C is a modification of FIG. 32A where the acceleration measuring device 154 includes a vehicle velocity measuring sensor. FIG. 32D is a modification of FIG. 32A where the acceleration measuring device 154 includes a semiconductor accelerometer. FIG. 33A is a simplified schematic illustrating the major components of the movable tongue system 46 of FIG. 32, which include an electro-mechanical actuator 48 and a movable tongue member 54. The electro-mechanical actuator 48 drives or moves the tongue member 54 from a first tongue position 61 to or toward a second tongue position 62 (see e.g., FIGS. 6 and 7 illustrating first and second tongue positions 61, 62 for the first embodiment). Each of FIGS. 33B, 33C, 33D, 33E, 33F, 33G, 33H, 33I, 33J, 33K, and 33L is a modification of FIG. 33A where the electro-mechanical actuator 48 includes an electric motor, a solenoid, an electrically-switchable hydraulic valve, a hydraulic actuator, an electrically-switchable pneumatic valve, a pneumatic actuator, an electrically-switchable vacuum valve, a vacuum-driven actuator, an electrically-switchable pyrotechnic-driven actuator, an electrically-switchable explosive-charged actuator, and an electrically-switchable compressed-gas-driven actuator, respectively.

In the first embodiment, the electromechanical actuator 48 is a solenoid. In a prototype of the first embodiment, a Ledex brand Size 5 SF solenoid is used on each side of the system 32, for example. The specifications for this linear solenoid (part number 129450-0XX) are provided in Table 1 below. Some of the advantages of using a solenoid may include: little or no maintenance required; fast reaction time for activation; fast movement for driving tongue member; small size; only requires electrical energy source; and low cost, for example. In other embodiments (not shown), however, the electromechanical actuator 48 used to move the tongue member 54 may be any of a wide variety of suitable components, systems, or combinations of components, including (but not limited to): an electric motor, a solenoid, an electrically-switchable hydraulic valve, a hydraulic actuator, an electrically-switchable pneumatic valve, a pneumatic actuator, an electrically-switchable vacuum valve, a vacuum-driven actuator, an electrically-switchable pyrotechnic-driven actuator, an electrically-switchable explosive-charged actuator, an electrically-switchable compressed-gas-driven actuator, and combinations thereof, for example.

TABLE 1

Example Solenoid Specifications

| | |
|---|---|
| Dielectric Strength | 23 awg. 1000 VRMS; 24–33 awg. 1200 VRMS |
| Coil Resistance | 23–33 awg. ± 5% |
| Weight | 9.0 oz. (255 grams) |
| Holding Force | 58.0 lbs. (258.0 N) @ 105° C. |
| Dimensions | 1.875 in. × 0.880 in. |

In the first embodiment, the acceleration measuring device 154 is a semiconductor chip having an accelerometer sensor. One example of an accelerometer is an Analog Devices brand dual-axis accelerometer on a single integrated circuit chip with signal conditioned voltage outputs (model number ADXL 311). This accelerometer has a full-scale range of ±2 g, and can measure both static and dynamic accelerations. Advantages of this accelerometer may include being: low cost, small size, high reliability, and light weight, for example. The outputs are analog voltages proportional to acceleration. However, only a single axis accelerometer is needed for most applications of the present invention. In other embodiments, other makes, models, and types of accelerometers may be used. A lookup table may be used to translate the output voltage to the corresponding acceleration measurement along a given axis. An accelerometer and the other electrical components of the system 32 may be mounted together or separately at any suitable location on a vehicle 22. It is contemplated that the signal generating device 154 and at least part of the triggering device 156 may be part of a same integrated circuit chip.

Figure 36:
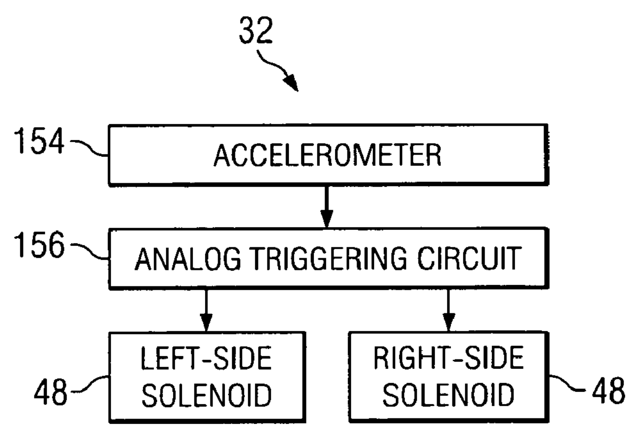
FIG. 36 is a simplified schematic for components of an embodiment of the present invention.

The triggering device 156 of the first embodiment is a microcontroller or microprocessor on a single integrated circuit chip. The microprocessor 156 may be programmed (e.g., running software code stored therein, or having the code temporarily or permanently burned in) to evaluate the output signal from the signal generating device 154. For example, a Microchip brand enhanced flash microcontroller (PIC16F87XA) may be used, which includes: a 10-bit, up to 8 channels analog-to-digital converter; an analog comparator module; programmable on-hip voltage reference module; programmable input multiplexing from device inputs and internal voltage reference; comparator outputs that are externally accessible; enhanced flash program memory; data EEPROM memory; fully static design; operating voltage of 2.0V to 5.5V; commercial and industrial temperature ranges; and low power consumption. In other embodiments (not shown), however, other microprocessors or other controllers may be used (analog or digital or combination analog and digital) as a triggering device 156. Also, in other embodiments (not shown), a purely analog electrical circuit may be used to evaluate whether the output signal from a signal generating device 154 exceeds some predetermined threshold level. For example, the triggering device 156 may include an analog electrical circuit of one or more capacitors, one or more resistors, and one or more transistors, to provide comparators and amplifiers (see e.g., general schematic of FIG. 36). It is also contemplated that at least part of the signal generating device 154 and/or at least part of the triggering device 156 may be an integral part of or within the same casing as at least part of the movable tongue system 46, and vice versa.

Figure 34:
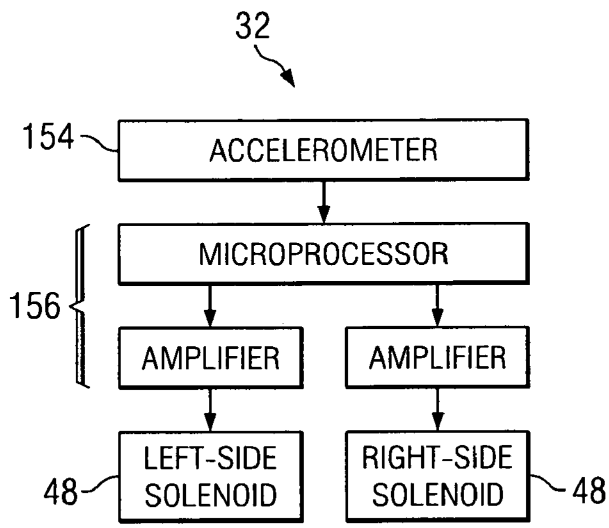
Figure 35A:
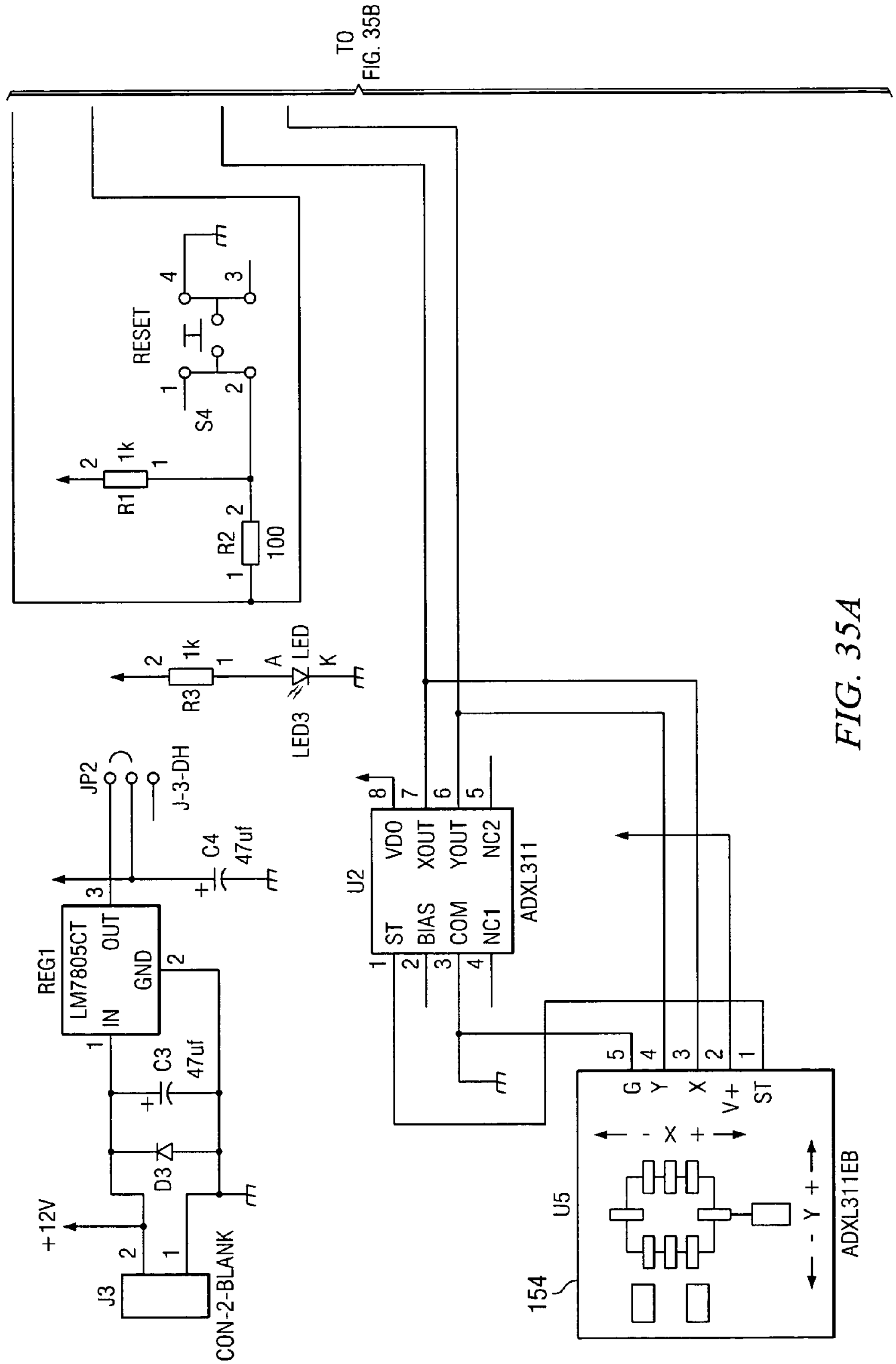
FIGS. 35A–35C show a detailed electrical schematic for components of the first embodiment.
Figure 35B:
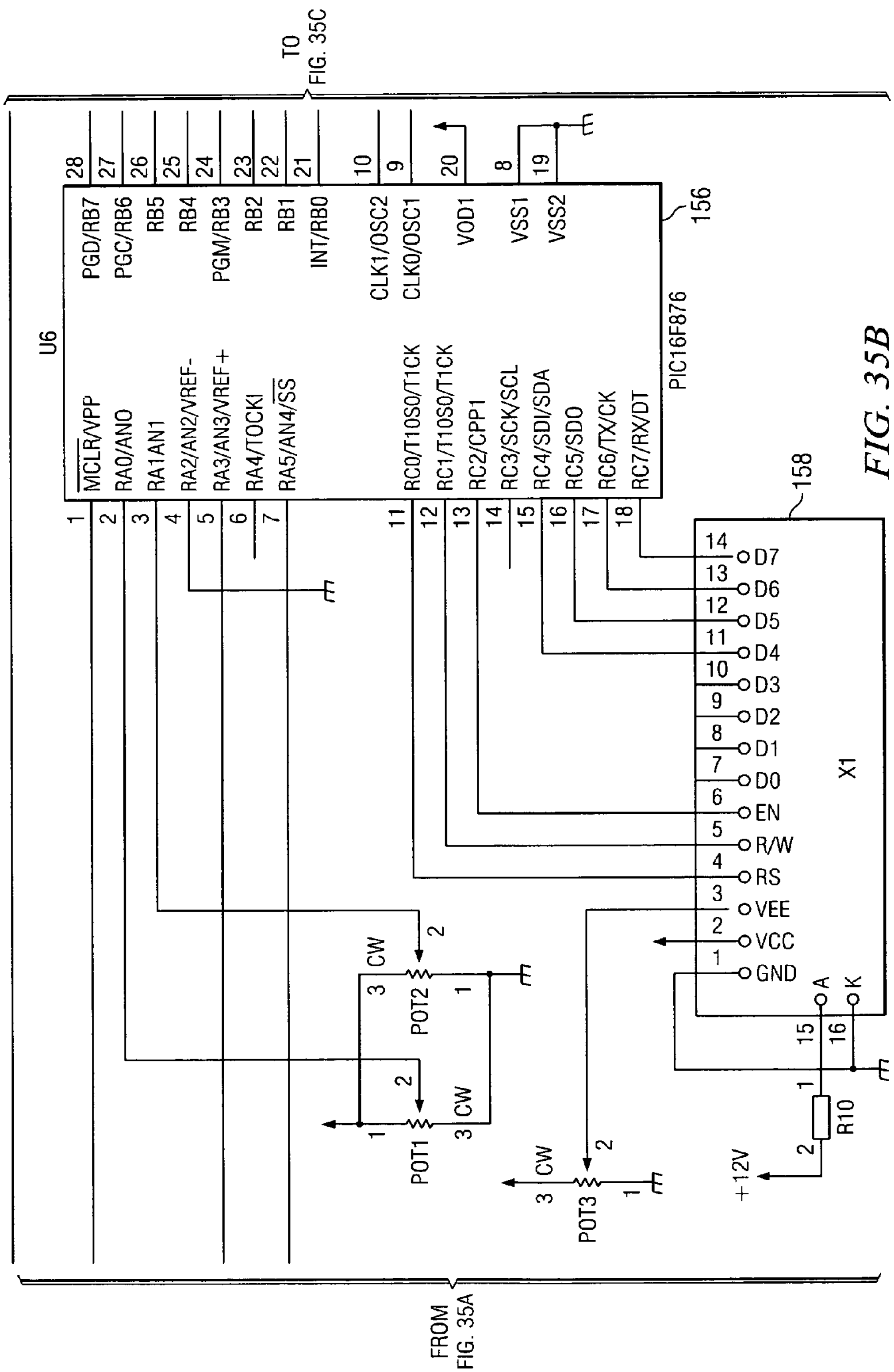
Figure 35C:
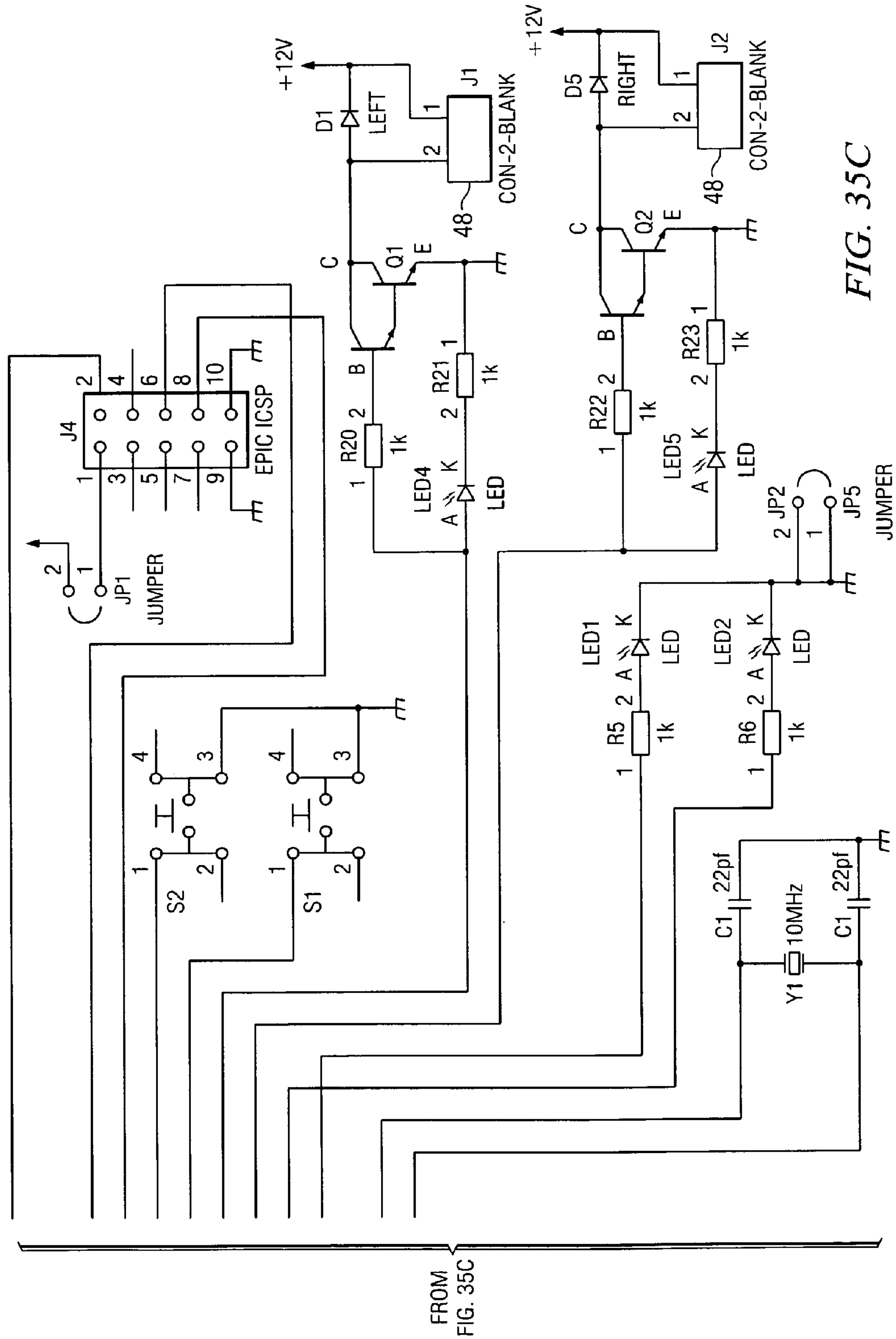

FIG. 34 is a simplified schematic showing components of the first embodiment (the signal generating device 154, the triggering device 156, and part of the movable tongue system 46). FIGS. 35A–35C show a detailed electrical schematic for the components of FIG. 34, for the first embodiment. This is merely one example among many ways to provide these functions. The vehicle stability control system 32 of the first embodiment is a prototype system used for testing and developing the system 32. Thus, the triggering device 156 of the first embodiment is adjustable and an LED display 158 is provided (see FIGS. 35A–35C) for seeing settings made to the set points and to see output data stored in the microcontroller. In other embodiments, such as a production version of the system 32 for an OEM system, the circuitry and devices may be much more simplified because the threshold limits and the logic may be set without needing future adjustments. Furthermore, it is contemplated that the vehicle's CPU or ECU may be used to run a simple algorithm to determine if the system 32 needs to be activated based on an output from a signal generating device 154. Thus, the triggering device 156 may be part of the vehicle's other systems.

In the first embodiment, for example, output signals from the accelerometer 154 are provided as inputs to the microprocessor. Within the microcontroller chip (in this case), the analog signal from the accelerometer 154 is converted to a digital signal. This digital signal is then compared to a threshold value to determine whether the output signal from the accelerometer exceeds the threshold level for some predetermined number of cycles (one or more). When the output signal from the accelerometer does exceed the predetermined threshold level, the output signal from the microprocessor goes high and that output signal is then amplified by one or more amplifiers. The amplifiers may be a series of transistors to provide the voltage and ampere levels required to drive the solenoids, for example. In the first embodiment, both left and right solenoids 48 are activated at the same time. In other embodiments, the left and right sides may be activated at different times in accordance with any set of criteria or conditions programmed into the system. The system 32 may be activated for some predetermined amount of time to keep the solenoids 48 energized and driving the tongue member 54 toward the second tongue position 62. This predetermined amount of time may be adjustable or preset in the system 32. Preferably, the system 32 remains activated until the vehicle becomes stable. The system 32 may be kept activated based upon measurements taken from any of a variety of sensors and/or types of sensors that can provide measurement(s) (singularly or when combined signals are processed) indicating that the vehicle 22 is stable (e.g., not experiencing lateral accelerations above some level, speed reduced below some level, tilt angle of the vehicle below some level for some period of time, etc.). In a preferred embodiment, the system is set to be very sensitive (e.g., very low lateral acceleration threshold for activating the system, such as about 0.2 g for example) to activate preemptively before there is any significant movement of the vehicle toward a rollover. This is in contrast to all or most all other roll control systems that are only activated after the vehicle reaches a critical and advanced stage of rolling over. To use such a sensitive setting for the lateral acceleration level of activation, it is preferred to have the system on standby (e.g., off, or on but not allowing solenoid to be activated) at lower speeds (e.g., below about 30 mph). Otherwise the system would likely come on while turning normal city corners or sharp corners at low speeds and entering driveways, for example. This would be unneeded and probably undesirable. At low speeds (e.g., below 30 mph), the driver would likely hear and feel the system being activated and deactivated. But at higher speeds (e.g., above 30 mph), the system would seldom, if ever, be activated, and the driver would probably not hear or notice the system being activated and deactivated due to the higher speed and road noise.

Although the illustrative embodiments discussed above may have the same type of signal generating device 154, triggering device 156, and movable tongue system 46 as the first embodiment, and may have the same type of logic for triggering and activating the system 32, other embodiments and variations of embodiments may have different types and combinations of components and logic for the signal generating device(s) 154, triggering device(s) 156, and movable tongue system(s) 46.

For an embodiment of the present invention, a vehicle velocity or speed signal may be input to the microprocessor in addition to the acceleration measurement(s). In such case, the system 32 may be programmed so that the system 32 will not be activated unless the vehicle's speed is above a predetermined speed threshold level (e.g., 30 mph). This may be more practical and preferred for several reasons. When making a sharp turn at low speeds (e.g., during normal driving), the lateral acceleration may be much higher while not putting the vehicle 22 in a dangerous maneuver (due to the low speed). Also, most vehicles are not susceptible to rollovers (without being tripped) at speeds below 30 mph, for example, and thus the system may not be needed at such speeds. The speed signal may be generated by a separate speed sensor (used only for this system 32) and/or may be provided by an existing sensor of data output given by a vehicle's other systems (e.g., speed signal sent to cruise control system from vehicle CPU).

In another embodiment of the present invention, the signal generating device 154 may include (singularly or in any combination) other types of devices and/or sensors, including (but not limited to): a sensor for measuring movement (acceleration, velocity, and/or position) of a vehicle's steering wheel; a sensor for measuring and providing an output signal for a vehicle body position relative to a ground surface; a sensor for measuring and providing an output signal for a vehicle body's tilt angle relative to a ground surface; a sensor for measuring and providing an output signal for a vehicle body position relative to at least one vehicle wheel; or a sensor for measuring and providing an output signal for a tilt angle of a vehicle body relative to one or more vehicle wheels, for example. The system 32 may be programmed or hard wired to be triggered based on any number of input signals from any number of signal generating devices 154, which may provide multiple and/or confirming indications that a vehicle 22 is performing a maneuver that may lead to rollover conditions (e.g., hard corning, sudden steering movements at high speeds, etc.). With the benefit of this disclosure, one of ordinary skill in the art will likely realize many possible ways to evaluate conditions of a vehicle's dynamics to determine whether a ratchet mechanism should be engaged by a tongue member to provide the ratcheting effect desired to enhance the stability and control of a vehicle using an embodiment of the present invention. The illustrative signal generating devices 154 and triggering devices 156 disclosed herein are merely examples and in no way limit what others may be implemented into an embodiment of a present invention. Often signals needed or desired for an embodiment may be generated already by an existing component of the vehicle, and thus some existing part of the vehicle may be used as the signal generating device or as part of the signal generating device for the system.

Figure 37A:
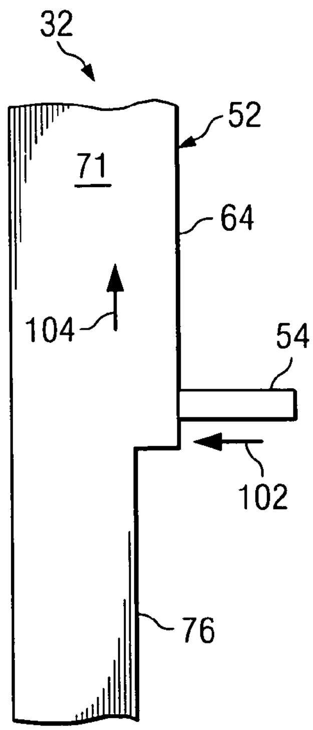
FIGS. 37A–37C illustrate a shaft member with a single tooth and a tongue member of a twelfth illustrative embodiment of the present invention.
Figure 37B:
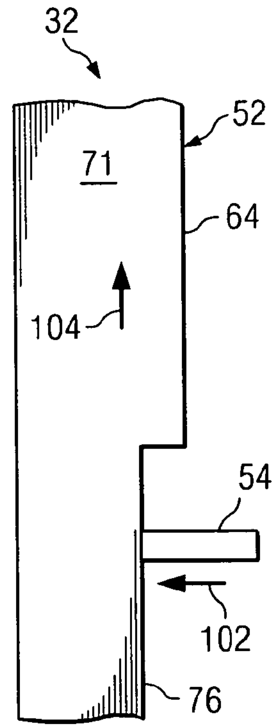
Figure 37C:
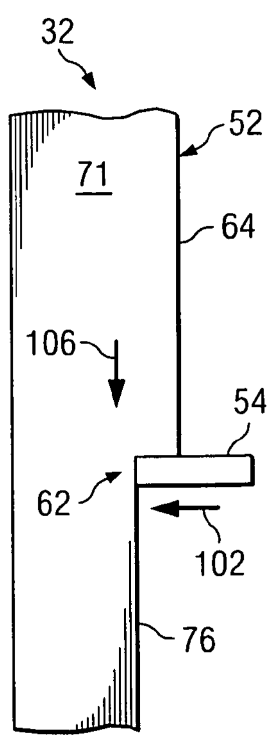

FIGS. 37A–37C illustrate a shaft member 71 with a single tooth 64 and a tongue member 54 of a twelfth illustrative embodiment of the present invention. Only part of the system 32 of the twelfth embodiment is shown, for purposes of simplifying the drawing. FIGS. 37A–37C also illustrate the movement of the shaft member 71 relative to the tongue member 54 for the twelfth embodiment. Thus, the twelfth embodiment is an example of one way (among many others possible) to provide a ratchet mechanism 52 where the shaft member 71 has only one tooth 64.

Figure 38:
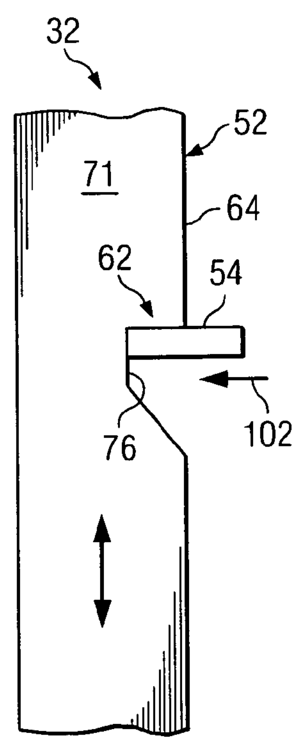
FIG. 38 illustrates a shaft member with a single tooth and a tongue member of a thirteenth illustrative embodiment of the present invention.

FIG. 38 illustrates a shaft member 71 with a single tooth 64 and a tongue member 54 of a thirteenth illustrative embodiment of the present invention. Only part of the system 32 of the thirteenth embodiment is shown, for purposes of simplifying the drawing. FIG. 38 also illustrates the tongue member 54 for the thirteenth embodiment in the second tongue position 62. Thus, the thirteenth embodiment is an example of one way (among many others possible) to provide a ratchet mechanism 52 where the shaft member 71 has only one tooth 64 formed by one recessed portion 76.

Figure 39:
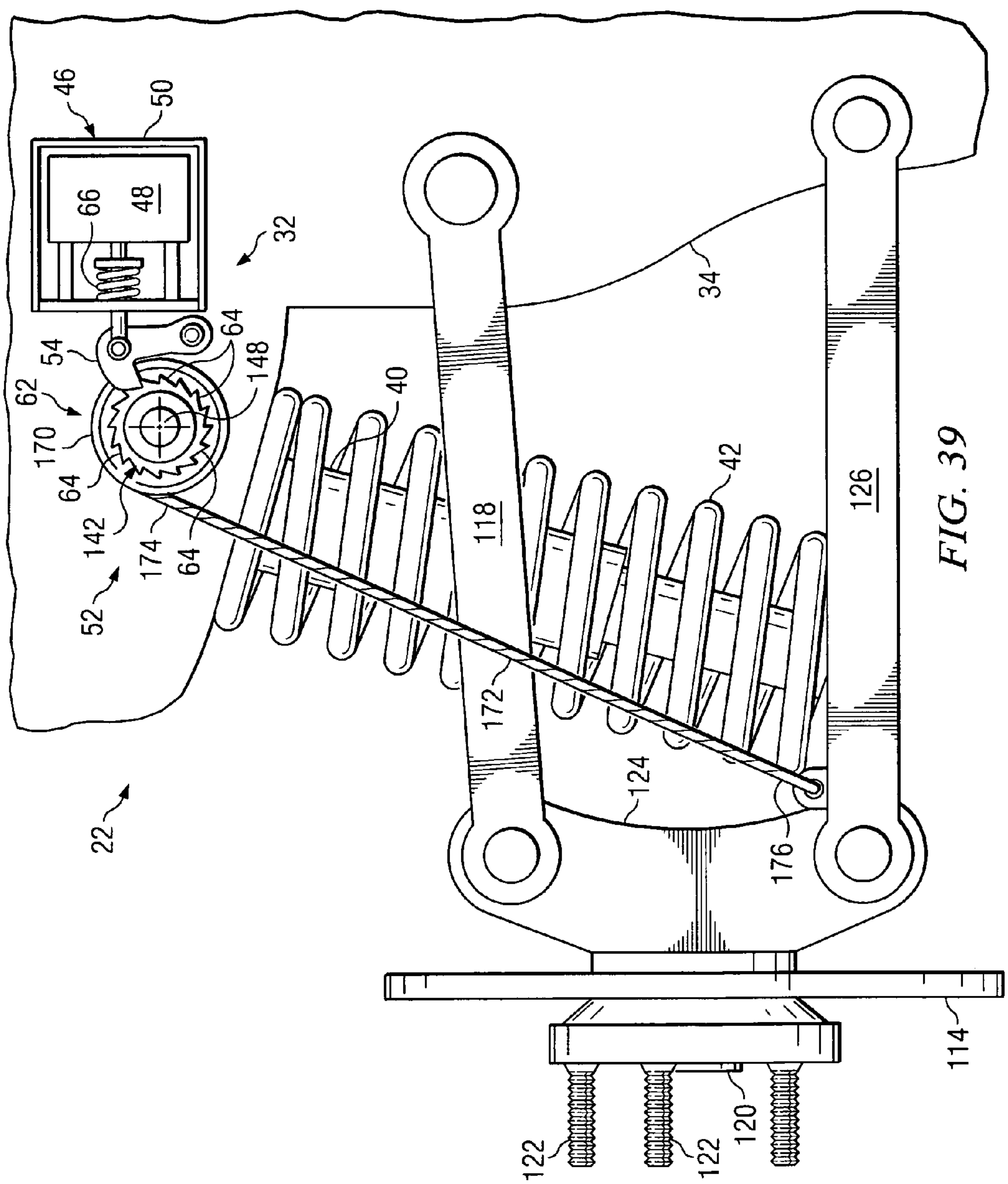
FIG. 39 shows a system of a fourteenth embodiment of the present invention operably installed on a vehicle.

FIG. 39 shows a system 32 of a fourteenth illustrative embodiment of the present invention operably installed on a vehicle 22. As in FIG. 29, FIG. 39 shows a rear independent suspension system for one side of the vehicle 22. The wheel and tire are removed in FIG. 39. The brake system shown in FIG. 39 includes a brake caliper (not shown) and a brake disc 114. The suspension system has a coil spring 42, a shock absorber 40, an upper control arm 118, a wheel axle 120 (with wheel studs 122 extending therefrom), an upright member 124, and a lower control arm 126, as shown in FIG. 39. In the fourteenth embodiment shown in FIG. 39, the ratchet mechanism 52 of the vehicle stability control system 32 is attached between a sprung mass portion (e.g., frame or body) of the vehicle 22 and the lower control arm 126 of the suspension (which is part of the unsprung portion of the vehicle). In other variations of the fourteenth embodiment, the ratchet mechanism may be attached to other unsprung portions of the vehicle 22 (e.g., upper control arm 118, upright member 124).

The ratchet mechanism 52 of FIG. 39 includes a pulley member 170, a ratchet gear 142, and a cable 172. The pulley member 170 is rotatably coupled to the sprung mass portion of the vehicle 22 (e.g., frame 34). The cable 172 has a first end 174 attached to the pulley member 170. The cable extends from the pulley member 170 and is attached to the lower control arm 126 at a second end 176 of the cable 172. The pulley member 170 is adapted to spool the cable 172 at least partially around the pulley member 170 as the pulley member pivots or rotates. A pulley spring (not shown) biases the pulley member 170 to pivot in a direction that will spool the cable 172 onto the pulley member 170 to keep tension on the cable 172. A ratchet gear 142 extends from the pulley member 170. In the fourteenth embodiment, the ratchet gear 142 extends circumferentially completely around a pivot axis 148 of the pulley member 170. In other embodiments (not shown), however, the ratchet gear 142 may only extend (circumferentially) partially around the pivot axis 148. In the fourteenth embodiment, the ratchet gear 142 is fixed relative to the pulley member 170 and pivots with it. The ratchet gear 142 has a series of ratchet teeth 64. The teeth 64 of a ratchet gear 142 may have any suitable shape, but preferably correspond to a shape chosen for the movable tongue member 54. The movable tongue member 54 of the fourteenth embodiment has a pawl shape. The tongue member 54 of the fourteenth embodiment is adapted to pivot from a first tongue position to or toward a second tongue position 62 (second tongue position 62 is shown in FIG. 39). Thus, the fourteenth embodiment illustrates that the tongue member 54 may be moved in a pivotal or rotational movement when moving from a first tongue position to or toward a second tongue position for an embodiment of the present invention.

It is also contemplated that an embodiment of the present invention may use a one way bearing that can be engaged and disengaged (e.g., along a spline shaft) to provide a ratchet mechanism. With the benefit of this disclosure one of ordinary skill in the art may realize other possible ways to provide a ratchet mechanism for an embodiment of the present invention.

Although initial testing has shown that a system 32 of the present invention works well when only installed on a rear suspension of a vehicle 22 (especially for SUVs), it is contemplated that an embodiment of the present invention may be installed on the front and rear suspensions of a vehicle, or only on a front suspension of a vehicle. It is further contemplated that a portion of an embodiment installed on a front suspension of the vehicle may be triggered and operated together with, partially independent of, or completely independent of an embodiment installed on a rear suspension of the same vehicle.

Many advantages and safety benefits may be provided by installing and using a vehicle stability control system 32 on a vehicle 22, in accordance with an embodiment of the present invention. Life threatening situations may be detected and dealt with in a simple but effective manner. An embodiment of the present invention may provide a proactive way to give a driver more control well before the vehicle reaches a compromised rollover position. Tests have shown that a vehicle may be capable of making a much sharper turn when the system 32 is activated. During an extreme or emergency maneuver, sometimes a few feet or more decrease in turning radius may make the difference between a deadly collision and a minor scrape. A system 32 of an embodiment may be changed from a completely inactive (non-interfering) state to a partially or completely activated state in milliseconds. A system 32 of an embodiment may be installed as an aftermarket item on existing vehicles, it may be provided as an upgrade option for new vehicles (e.g., installed at the dealer), and it may be an integral part of a new vehicle (e.g., OEM equipment, standard equipment).

It is recognized that a large percentage (perhaps 90% or more) of rollovers are caused by trips (hitting an object while cornering or sliding sideways). Trip objects may be curbs, embankments, pot holes, uneven pavement, and other obstructions that interfere with the vehicle moving laterally (e.g., rapid transition from sliding on ice to non-iced pavement), for example. Many of these accidents are caused by a driver losing control of the vehicle when the vehicle is unable to make a small radius turn at high speeds to avoid such trip objects. Use of an embodiment of the present invention may significantly increase the stability of a vehicle and allow it to make smaller radius turns, thereby possibly avoiding the trip object. Also, because the suspension is still permitted to be compressed by the ratchet mechanism of an embodiment, the wheel may be able to move over or climb over the trip object, rather than stopping at the trip object. Furthermore, by keeping the vehicle's center of gravity 30 lower when the system 32 is activated, the lateral force required to roll upon hitting a trip object may be greatly increased, and such increased lateral force may not be reached (e.g., trip object broken or part of vehicle hitting trip object broken to absorb part of the lateral force energy and vehicle momentum).

Tire blowouts and tire debeading have been caused by major weight shifts to the outside front tire in a severe turn. When a tire blows out or debeads during a severe turn, the wheel rim hitting the ground and digging into the ground may provide a trip mechanism. Many vehicle rollovers have been caused by tire blowouts and tire debeading. By reducing the lateral weight shift and weight transfer of the vehicle's body weight when a system 32 of an embodiment is activated, the weight and pressure exerted on outer tires is reduced. The problems of tire blowouts or tires debeading during severe cornering may be reduced or eliminated through the use of an embodiment of the present invention due to the reduced forces exerted on the outside tires.

Other advantages of some embodiments of the present invention may include (but are not necessarily limited to): requiring little or no maintenance during the life of the system; the system requires no adjusting; the system is silent or very quiet when activated; the system may be activated and fully engaged in less than 10 ms, and possibly as fast as 4 ms; the system may be used without affecting steering, braking, throttle position, and other stability control systems already present on a vehicle during normal driving; the system may be used in conjunction with other vehicle stability control systems to provide a cumulative improvement in stability and control; use of an embodiment may enable the use of a softer and more comfortable suspension setup without sacrificing safety; in a preferred embodiment, the system is off at speeds below about 30 mph and comes on standby at speeds over 30 mph, but remains inactive until needed; the system becomes fully operational in less than 1/100 of a second; the system requires no action or decision on the part of the driver; the system turns itself off when no longer needed and the vehicle returns to the same state as before the system was turned on (no permanent change in activating the system); when activated, the system may stabilize the vehicle in a severe turn to give the driver much more maneuverability and control of the vehicle; may be installed on any vehicle, regardless of vehicle size or type (e.g., buses, large trucks, vans, SUVs, station wagons, cars); the system may be installed with little or no permanent alterations to the vehicle; the system is inexpensive; the system is reliable; and the system may be used many times and/or repeatedly without maintenance, rebuilding, or repair.

Use of an embodiment of the present invention may allow many, if not all, existing SUVs and pickup trucks to improve their safety ratings with agencies, such as NHTSA. But more importantly, use of an embodiment of the present invention may save thousands of lives and prevent thousands of serious accidents (e.g., rollovers) and injuries. Such reductions not only benefit society greatly, but also may reduce or reverse the rising cost of insurance coverage.

Although embodiments of the present invention and at least some of its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A vehicle stability control system, comprising:

a movable tongue member adapted to move between a first tongue position and a second tongue position; and a ratchet mechanism adapted to be mechanically coupled to a movable unsprung mass portion and to a sprung mass portion of a vehicle when the vehicle stability control system is operably installed on the vehicle, the ratchet mechanism comprising a ratchet tooth, such that the ratchet mechanism is adapted to restrict a movement of the unsprung mass portion away from the sprung mass portion when the tongue member is moved toward the second tongue position and into the ratchet tooth, and wherein the tongue member does not restrict the movement of the unsprung mass portion relative to the sprung mass portion when the tongue member is in the first tongue position.

2. A vehicle having the vehicle stability control system of claim 1 installed thereon.

3. A vehicle stability control system, comprising:

a movable tongue system comprising an electro-mechanical actuator and a movable tongue member, wherein the electro-mechanical actuator is mechanically coupled to the tongue member to provide movement of the tongue member from a first tongue position toward a second tongue position;

an electrical triggering device adapted to be electrically coupled to a signal generating device, the triggering device also being electrically coupled to the electro-mechanical actuator, the triggering device being adapted to activate the electro-mechanical actuator based, at least in part, on an output signal received from the signal generating device; and a ratchet mechanism adapted to be mechanically coupled to a movable unsprung mass portion and to a sprung mass portion of a vehicle when the vehicle stability control system is operably installed on the vehicle, the ratchet mechanism comprising a set of ratchet teeth, such that the ratchet mechanism is adapted to restrict a movement of the unsprung mass portion away from the sprung mass portion when the electro-mechanical actuator moves the tongue member toward the second tongue position and into the set of ratchet teeth.

4. The vehicle stability control system of claim 3, wherein the signal generating device is an acceleration measuring device.

5. The vehicle stability control system of claim 4, wherein the output signal corresponds to a lateral acceleration of the vehicle.

6. The vehicle stability control system of claim 3, wherein the output signal corresponds to a movement of a steering wheel on the vehicle.

7. The vehicle stability control system of claim 6, wherein the signal generating device comprises a sensor adapted to measure movement of the steering wheel.

8. The vehicle stability control system of claim 3, wherein the output signal corresponds to a velocity of the vehicle.

9. The vehicle stability control system of claim 8, wherein the signal generating device comprises a sensor adapted to measure the velocity of the vehicle.

10. The vehicle stability control system of claim 3, wherein the output signal corresponds to a vehicle body position relative to a ground surface.

11. The vehicle stability control system of claim 10, wherein the signal generating device comprises one or more sensors adapted to measure a tilt angle of a vehicle body relative to the ground surface.

12. The vehicle stability control system of claim 3, wherein the output signal corresponds to a vehicle body position relative to at least one vehicle wheel.

13. The vehicle stability control system of claim 3, wherein the signal generating device comprises one or more sensors adapted to measure a tilt angle of a vehicle body relative to one or more vehicle wheels.

14. The vehicle stability control system of claim 3, wherein the electro-mechanical actuator comprises a solenoid.

15. The vehicle stability control system of claim 3, wherein the electro-mechanical actuator comprises a component selected from the group consisting of an electric motor, a solenoid, an electrically-switchable hydraulic valve, a hydraulic actuator, an electrically-switchable pneumatic valve, a pneumatic actuator, an electrically-switchable vacuum valve, a vacuum-driven actuator, an electrically-switchable pyrotechnic-driven actuator, an electrically-switchable explosive-charged actuator, an electrically-switchable compressed-gas-driven actuator, and combinations thereof.

16. The vehicle stability control system of claim 3, wherein the electrical triggering device comprises an analog electrical circuit, wherein the analog electrical circuit comprising a capacitor, a resistor, and a transistor.

17. The vehicle stability control system of claim 3, wherein the electrical triggering device comprises a microprocessor and an amplifier.

18. The vehicle stability control system of claim 3, wherein the tongue member has an end profile comprising a shape selected from the group consisting of rectangular, partially rounded, notched, pawl shaped, partially beveled, beveled, hook shaped, lip shaped, flat, curved, concave, convex, and combinations thereof.

19. The vehicle stability control system of claim 3, wherein at least some of the ratchet teeth comprise a tooth shape selected from the group consisting of rectangular, partially rounded, notched, pawl shaped, partially beveled, beveled, hook shaped, lip shaped, flat, curved, concave, convex, and combinations thereof.

20. The vehicle stability control system of claim 3, wherein at least some of the ratchet teeth are formed along a curved path.

21. The vehicle stability control system of claim 3, wherein at least some of the ratchet teeth are formed along a linear path.

22. The vehicle stability control system of claim 3, wherein the ratchet mechanism comprises:

a first slider portion; and a second slider portion slidably coupled to the first slider portion.

23. The vehicle stability control system of claim 3, wherein the ratchet mechanism is attached to and part of a shock absorber device.

24. The vehicle stability control system of claim 3, wherein the ratchet mechanism comprises a ratchet gear extending from a suspension arm and extending circumferentially at least partially around a pivot axis of the suspension arm, wherein the ratchet gear is fixed relative to the suspension arm and adapted to pivot with the suspension arm about the pivot axis.

25. The vehicle stability control system of claim 3, wherein the ratchet mechanism comprises:

a first arm;

a second arm pivotably coupled to the first arm, at least part of the movable tongue system being attached to the second arm; and a tooth arm extending from the first arm, the tooth arm having the set of ratchet teeth thereon, and the tooth arm extending across at least part of the movable tongue system when the vehicle stability control system is operably installed on the vehicle.

26. The vehicle stability control system of claim 3, further comprising:

a roller member attached about a portion of the ratchet mechanism, the roller member being adapted to rotate about the ratchet mechanism.

27. A vehicle having the vehicle stability control system of claim 3 installed thereon.

28. The vehicle stability control system of claim 3, wherein the ratchet mechanism comprises:

a pulley member adapted to be rotatably coupled to the sprung mass portion of the vehicle;

a cable having a first end attached to the pulley member, the cable extending from the pulley member, where the pulley member is adapted to spool the cable at least partially around the pulley member as the pulley member pivots, and the cable being adapted to attach to the unsprung mass portion of the vehicle to extend between the unsprung mass portion and the pulley member;

a pulley spring biasing the pulley member to pivot in a direction that will spool the cable onto the pulley member to keep tension on the cable; and a ratchet gear extending from the pulley member, the ratchet gear having the set of ratchet teeth, wherein the ratchet gear pivots with the pulley member.

29. The vehicle stability control system of claim 3, wherein the movable tongue member is adapted to pivot about a tongue member axis as it moves from the first tongue position toward the second tongue position.

30. The vehicle stability control system of claim 3, wherein the movable tongue member is adapted to slide as it moves from the first tongue position toward the second tongue position.

31. A vehicle stability control system, comprising:

an acceleration measuring device adapted to measure at least a lateral acceleration of a vehicle when the vehicle stability control system is operably installed on the vehicle;

a movable tongue system comprising an electro-mechanical actuator and a movable tongue member, wherein the electro-mechanical actuator is mechanically coupled to the tongue member to provide movement of the tongue member from a first tongue position toward a second tongue position;

an electrical triggering device electrically coupled to the acceleration measuring device, the triggering device also being electrically coupled to the electro-mechanical actuator, the triggering device being adapted to activate the electro-mechanical actuator based, at least in part, on an output signal received from the acceleration measuring device; and a ratchet mechanism adapted to be mechanically coupled to a movable unsprung mass portion and to a sprung mass portion of the vehicle when the vehicle stability control system is operably installed on the vehicle, the ratchet mechanism comprising a set of ratchet teeth, such that the ratchet mechanism is adapted to restrict a movement of the unsprung mass portion away from the sprung mass portion when the electro-mechanical actuator moves the tongue member toward the second tongue position and into the set of ratchet teeth.

32. The vehicle stability control system of claim 31, wherein the acceleration measuring device comprises a semiconductor accelerometer adapted to provide a voltage output proportional to a measured acceleration.

33. A vehicle having the vehicle stability control system of claim 31 installed thereon.

34. A vehicle stability control system, comprising:

a first slider mechanism comprising a first slider portion, a second slider portion slidably coupled to the first slider portion, a first connector member extending from the first slider portion, the first connector member being adapted to be mechanically coupled to at least one of a sprung mass portion of a vehicle and an unsprung mass portion of the vehicle, wherein a vehicle spring is biased between the sprung mass portion and the unsprung mass portion of the vehicle, a second connector member extending from the second slider portion, the second connector member being adapted to be mechanically coupled to at least one of the unsprung mass portion of the vehicle and the sprung mass portion of the vehicle, a series of teeth formed along the first slider portion, and a movable tongue system comprising a moveable tongue member, the movable tongue system being attached to the second slider portion, the movable tongue system being adapted to position the tongue member in a first tongue position and a second tongue position, in the first tongue position, the tongue member being adapted to be located between at least some adjacent teeth of the series of teeth, such that the first slider portion may slide relative to the second slider portion as the unsprung mass portion moves toward the sprung mass portion of the vehicle, but such that the first slider portion is prevented from sliding relative to the second slider portion as the unsprung mass portion moves away the sprung mass portion of the vehicle, and in the second tongue position, the tongue member does not prevent sliding of the first slider portion relative to the second slider portion;

an acceleration measuring device adapted to output a first electrical signal corresponding to an acceleration measurement; and a triggering device electrically connected to the acceleration measuring device and the movable tongue system, the triggering device being adapted to send a second electrical signal to the movable tongue system based upon the first electrical signal.

35. The vehicle stability control system of claim 34, further comprising a second slider mechanism, wherein the second slider mechanism is essentially the same as the first slider mechanism.

36. The vehicle stability control system of claim 34, wherein the acceleration measuring device and the triggering device are part of a same electrical component.

37. The vehicle stability control system of claim 34, wherein the triggering device is part of the movable tongue system.

38. The vehicle stability control system of claim 34, wherein:

the first connector member is adapted to be mechanically coupled to the unsprung mass portion of the vehicle, the second connector member is adapted to be mechanically coupled to the sprung mass portion of the vehicle, the first slider portion has an elongated body, the second slider portion has a hollow elongated body, and the first slider portion slidably mates with the second slider portion and slides at least partially into the second slider portion when the unsprung mass portion moves toward the sprung mass portion of the vehicle.

39. The vehicle stability control system of claim 34, wherein at least some of the series of teeth comprise a top side and a bottom side, the top side being beveled at an angle relative to an axis of sliding for the first slider portion, and the bottom side being substantially perpendicular to the axis of sliding for the first slider portion.

40. The vehicle stability control system of claim 34, wherein at least some of the series of teeth comprise a top side and a bottom side, the top side having a curved profile, and the bottom side being substantially perpendicular to an axis of sliding for the first slider portion.

41. The vehicle stability control system of claim 34, wherein at least some of the series of teeth have a rectangular profile.

42. The vehicle stability control system of claim 34, wherein a distal end of the tongue member has a bottom side that is beveled at an angle relative to an axis of sliding for the first slider portion.

43. The vehicle stability control system of claim 34, wherein a distal end of the tongue member has a bottom side that has a curved profile.

44. The vehicle stability control system of claim 34, wherein the tongue member has a rectangular distal end profile.

45. The vehicle stability control system of claim 34, wherein the movable tongue system comprises a solenoid for driving movement of the tongue member between the first and second tongue positions.

46. A vehicle having the vehicle stability control system of claim 34 installed thereon.

* * * * *